(12) United States Patent
Hamada et al.

(10) Patent No.: US 11,049,396 B2
(45) Date of Patent: Jun. 29, 2021

(54) POSITION ESTIMATION APPARATUS, POSITION ESTIMATION METHOD, AND COMPUTER READABLE MEDIUM

(71) Applicant: Mitsubishi Electric Corporation, Tokyo (JP)

(72) Inventors: Yuji Hamada, Tokyo (JP); Yoshiaki Adachi, Tokyo (JP); Katsuya Kawai, Tokyo (JP); Masahiko Ikawa, Tokyo (JP); Takashi Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 293 days.

(21) Appl. No.: 15/779,751

(22) PCT Filed: Jan. 15, 2016

(86) PCT No.: PCT/JP2016/051160
§ 371 (c)(1),
(2) Date: May 29, 2018

(87) PCT Pub. No.: WO2017/122354
PCT Pub. Date: Jul. 20, 2017

(65) Prior Publication Data
US 2020/0312148 A1    Oct. 1, 2020

(51) Int. Cl.
*G08G 1/133*        (2006.01)
*G01S 19/42*        (2010.01)
*G08G 1/16*         (2006.01)

(52) U.S. Cl.
CPC .............. *G08G 1/133* (2013.01); *G01S 19/42* (2013.01); *G08G 1/163* (2013.01)

(58) Field of Classification Search
CPC ........ G08G 1/167; G08G 1/133; G08G 1/163; G01S 19/42; B60W 30/08; B60W 30/0956
See application file for complete search history.

(56) References Cited

U.S. PATENT DOCUMENTS

| | | | | |
|---|---|---|---|---|
| 2010/0010699 | A1* | 1/2010 | Taguchi | G08G 1/167 701/23 |
| 2011/0301779 | A1 | 12/2011 | Shida | |
| 2013/0223686 | A1* | 8/2013 | Shimizu | G08G 1/166 382/103 |

FOREIGN PATENT DOCUMENTS

| | | |
|---|---|---|
| CN | 103155015 A | 6/2013 |
| JP | 2000-180537 A | 6/2000 |

(Continued)

OTHER PUBLICATIONS

Japanese Notification of Reasons for Refusal issued in JP 2016-549539 dated Nov. 1, 2016.

(Continued)

*Primary Examiner* — Hongmin Fan
(74) *Attorney, Agent, or Firm* — Sughrue Mion, PLLC; Richard C. Turner

(57) ABSTRACT

A position estimation apparatus (10) acquires target information (31) regarding the position of a target body (100) and acquires neighboring information (32) regarding the position of a neighboring body, which is a movable body different from the target body (100), from the neighboring body. The position estimation apparatus (10) determines, as a primary area (41), a relative area in which the neighboring body is estimated to be present from the target information (31) and the neighboring information (32). The position estimation apparatus (10) calculates a probability of presence (43) of the neighboring body in each relative area from a plurality of the primary areas (41) determined within a reference period and determines, as a secondary area (44), a relative area in which the neighboring body is estimated to be present on the basis of the probability of presence (43).

8 Claims, 35 Drawing Sheets

(56) References Cited

FOREIGN PATENT DOCUMENTS

| | | | | |
|---|---|---|---|---|
| JP | 2008-117082 A | 5/2008 | | |
| JP | 4918807 B2 | 4/2012 | | |
| JP | 5041099 B2 | 10/2012 | | |
| JP | 2013-174556 A | 9/2013 | | |
| JP | 2013174556 | * | 9/2013 | ............. G01S 13/93 |
| JP | 2014-071839 A | 4/2014 | | |
| WO | 2012/033173 A1 | 3/2012 | | |

OTHER PUBLICATIONS

International Search Report of PCT/JP2016/051160 dated Apr. 19, 2016.
Communication dated Jun. 30, 2020, issued by the State Intellectual Property Office of the P.R.C. in application No. 201680078399.2.
Office Action dated Sep. 25, 2020 in Indian Application No. 201847023132.

* cited by examiner

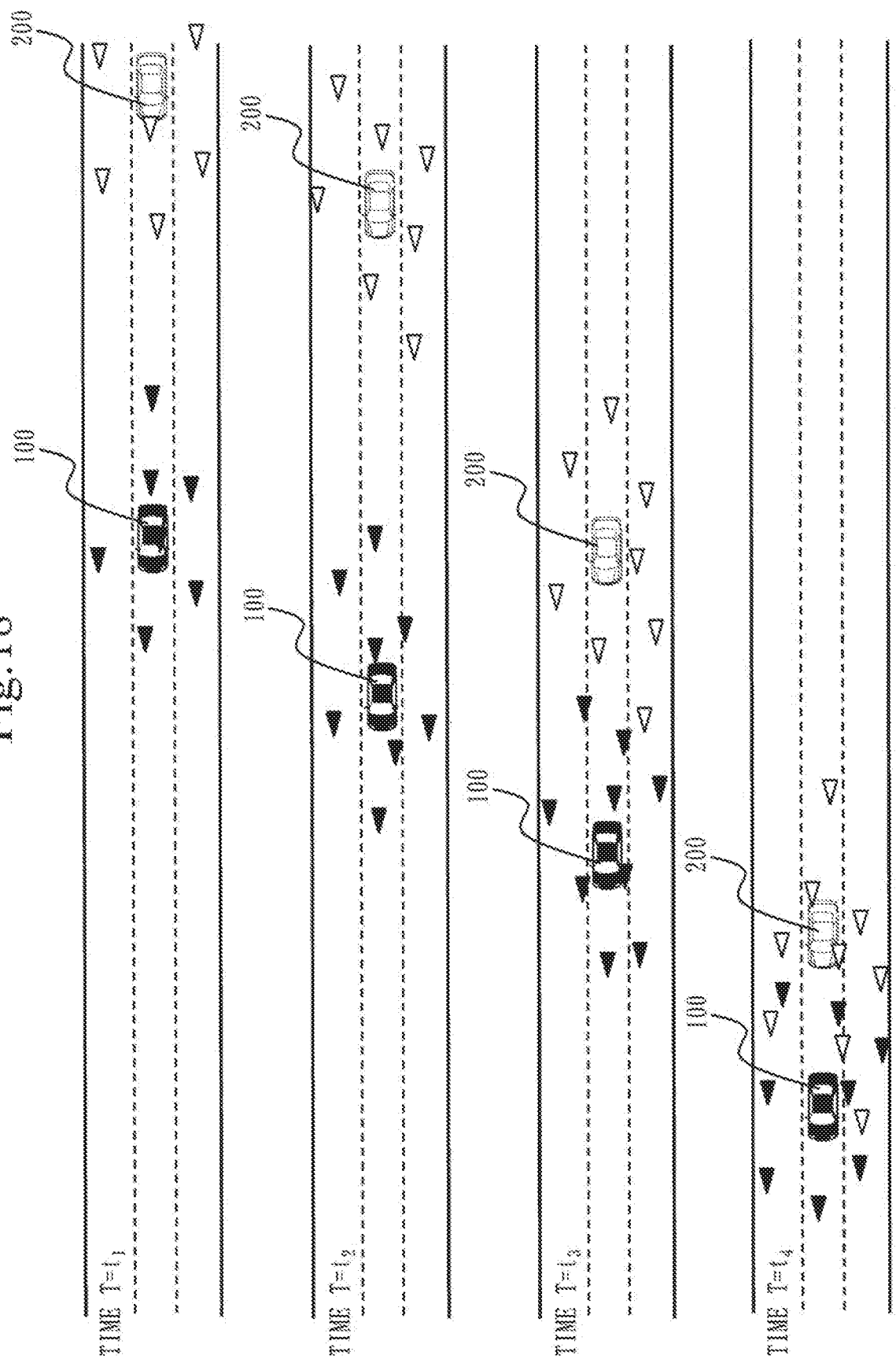

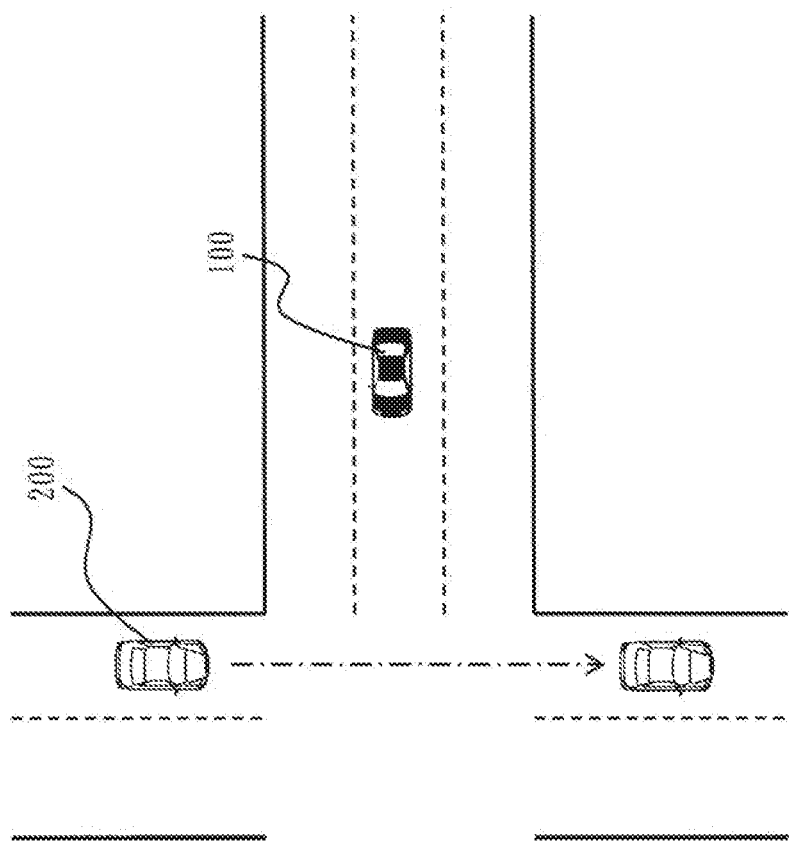

Fig. 20

| No. | SITUATION | | RELATIVE AREA 40 TO HAVE INCREASED PROBABILITY OF PRESENCE 43 | RELATIVE AREA 40 TO HAVE DECREASED PROBABILITY OF PRESENCE 43 |
|---|---|---|---|---|
| (1) | TARGET BODY 100 FOLLOWING NEIGHBORING BODY 200 | | AREA A: 1.3 TIMES | AREA B: 0.7 TIMES AREA BL AND BR: 0.8 TIMES |
| (2) | NEIGHBORING BODY 200 FOLLOWING TARGET BODY 100 | | AREA B: 1.3 TIMES | AREA A: 0.7 TIMES AREA AL AND AR: 0.8 TIMES |
| (3) | PASSING ON LEFT | INCOMPLETE | AREA AL AND BL: 1.1 TIMES | AREA A AND B: 0.7 TIMES |
|  |  | COMPLETE | AREA AL: 1.3 TIMES or AREA BL: 1.3 TIMES | AREA BL: 0.9 TIMES, AREA A AND B: 0.3 TIMES or AREA AL AND AR: 0.9 TIMES, AREA A AND B: 0.3 TIMES |
| (4) | PASSING ON RIGHT | INCOMPLETE | AREA AR AND BR: 1.1 TIMES | AREA A AND B: 0.7 TIMES |
|  |  | COMPLETE | AREA AR: 1.3 TIMES or AREA BR: 1.3 TIMES | AREA BR: 0.9 TIMES, AREA A AND B: 0.3 TIMES or AREA AR: 0.9 TIMES, AREA A AND B: 0.3 TIMES |
| (5) | TARGET BODY 100 APPROACHING NEIGHBORING BODY 200 AHEAD | | AREA A: α TIMES (α = 1.0 TO 1.3) | AREA B: β TIMES (β = 0.7 TO 1.0) |
| (6) | NEIGHBORING BODY 200 IN REAR APPROACHING TARGET BODY 100 | | AREA B: α TIMES (α = 1.0 TO 1.3) | AREA A: β TIMES (β = 0.7 TO 1.0) |
| (7) | CROSS FROM RIGHT TO LEFT | | AREA IL: α TIMES (α = 1.0 TO 1.5) | AREA IR: β TIMES (β = 0.3 TO 0.7) |
| (8) | CROSS FROM LEFT TO RIGHT | | AREA IR: α TIMES (α = 1.0 TO 1.5) | AREA IL: β TIMES (β = 0.3 TO 0.7) | though
POSITION ESTIMATION APPARATUS, POSITION ESTIMATION METHOD, AND COMPUTER READABLE MEDIUM

CROSS REFERENCE TO RELATED APPLICATIONS

This application is a National Stage of International Application No. PCT/JP2016/051160 filed Jan. 15, 2016.

TECHNICAL FIELD

The present invention relates to a technique for estimating a relative position of a neighboring movable body with respect to a target movable body.

BACKGROUND ART

There has been developed a driving assistance system using an in-vehicle communication device that wirelessly transmits and receives vehicle information including vehicle position information and the like at regular intervals. The driving assistance system for example determines a risk of collision on the basis of the vehicle information being transmitted or received, and provides information to a driver or controls the vehicle.

The vehicle position information indicated by the vehicle information is acquired by using a positioning satellite such as a Global Positioning System (GPS) or Global Navigation Satellite System (GNSS), for example. However, the position information acquired by using the positioning satellite includes errors due to a signal delay in the ionosphere, a multipath caused by buildings, a system delay, and the like. Due to the influence of these errors, the driving assistance system may not be able to accurately determine the risk of collision.

Patent Literature 1 describes that the distance between a vehicle and another vehicle is calculated on the basis of position information of the vehicle and position information of the other vehicle, and then the calculated distance is corrected on the basis of speed information of the vehicle and speed information of the other vehicle.

CITATION LIST

Patent Literature

Patent Literature 1: JP 2014-071839 A

SUMMARY OF INVENTION

Technical Problem

In Patent Literature 1, the distance calculated from a position indicated by the position information acquired via wireless communication is corrected on the basis of the speed information. Thus, when the position information of each of the vehicle and the neighboring vehicle includes an error, the relative positional relationship is based on a false distance and cannot be identified correctly.

The present invention aims at accurately estimating the relative positional relationship between movable bodies such as vehicles.

Solution to Problem

A position estimation apparatus according to the present invention includes:

an acquisition unit to acquire target information regarding a position of a target body which is a movable body and acquire neighboring information regarding a position of a neighboring body, which is a movable body different from the target body, from the neighboring body;

a primary estimation part to estimate a relative position between the target body and the neighboring body from the target information and the neighboring information acquired by the acquisition unit and determine, as a primary area, a relative area corresponding to the relative position from among a plurality of relative areas obtained by dividing an area around the target body;

a probability calculation part to calculate a probability of presence of the neighboring body in each of the relative areas from a plurality of the primary areas determined within a reference period by the primary estimation part; and a secondary estimation part to determine, as a secondary area, a relative area in which the neighboring body is estimated to be present on the basis of the probability of presence calculated by the probability calculation part.

Advantageous Effects of Invention

The present invention calculates the probability of presence of the neighboring body in each relative area from the plurality of the primary areas determined within the reference period and determines, as the secondary area, the relative area in which the neighboring body is estimated to be present on the basis of the probability of presence being calculated. As a result, the relative positional relationship between the target body and the neighboring body can be accurately estimated.

BRIEF DESCRIPTION OF DRAWINGS

FIG. 18 is an illustrative diagram of a weighting condition for the front and rear.

FIG. 19 is an illustrative diagram of a weighting condition for the sides.

FIG. 20 is an illustrative diagram of a specific example of weighting.

DESCRIPTION OF EMBODIMENTS

First Embodiment

Description of Configuration

Figure 1:
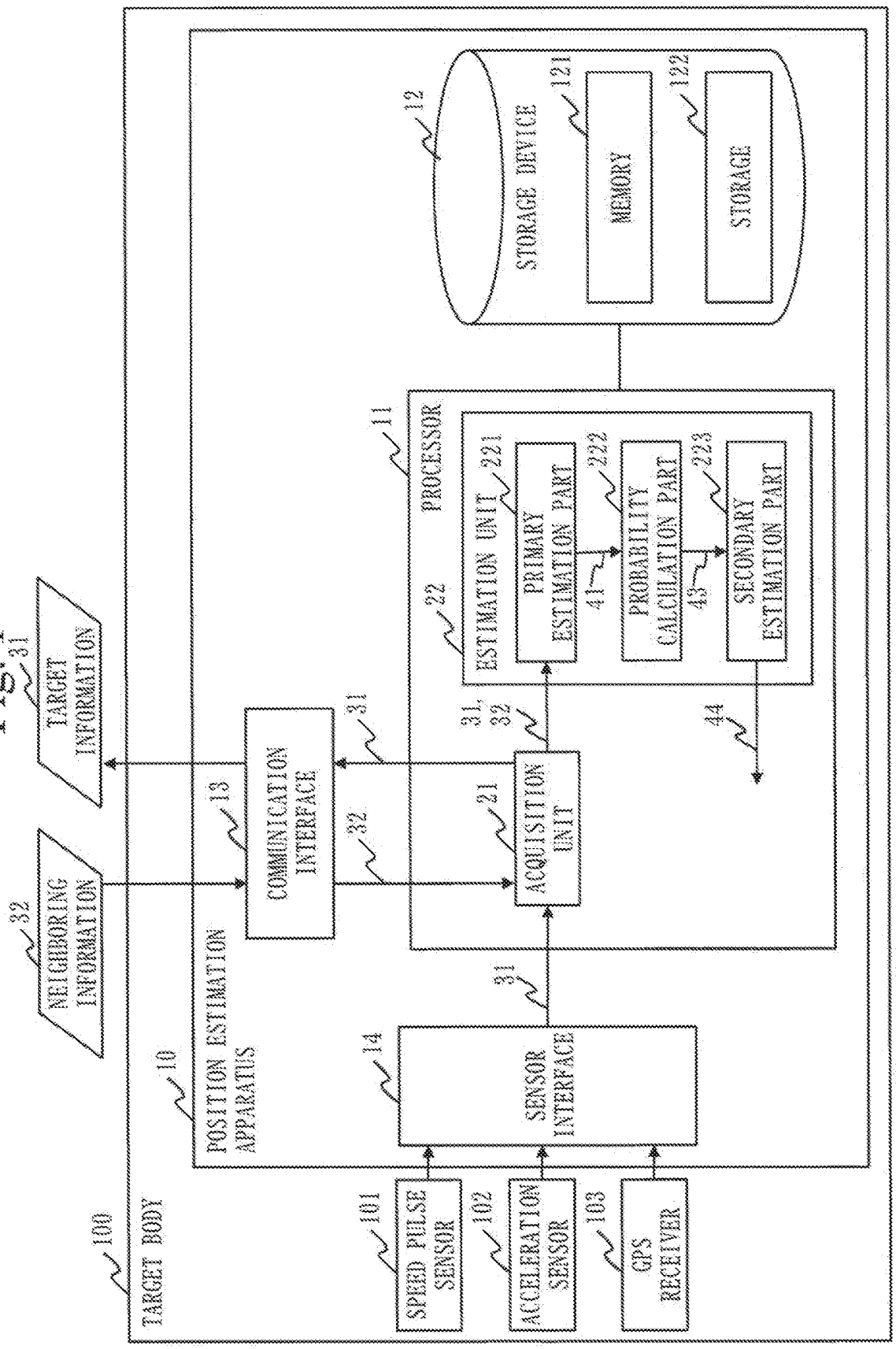
FIG. 1 is a block diagram of a position estimation apparatus 10 according to a first embodiment.

The configuration of a position estimation apparatus 10 according to a first embodiment will be described with reference to FIG. 1.

The position estimation apparatus 10 is a computer belonging to a target body 100 which is a movable body such as a vehicle or a pedestrian. The target body 100 is a vehicle in the first embodiment. Note that the position estimation apparatus 10 may be configured to be integral with the target body 100 or separable from the target body 100.

The position estimation apparatus 10 includes hardware as a processor 11, a storage device 12, a communication interface 13, and a sensor interface 14. The processor 11 is connected to the other hardware via a signal line to control these other hardware.

The processor 11 is an integrated circuit (IC) that executes processing such as data transfer, calculation, processing, control, and management by executing a command written in a program. The processor 11 has an arithmetic circuit as well as a register and a cache memory which store commands and information. The processor 11 is specifically a central processing unit (CPU), a digital signal processor (DSP), or a graphics processing unit (GPU), for example.

The storage device 12 includes a memory 121 and a storage 122. The memory 121 is specifically a random access memory (RAM), for example. The storage 122 is specifically a hard disk drive (HDD), for example. Alternatively, the storage 122 may be a portable storage medium such as a Secure Digital (SD) memory card, a CompactFlash (CF), a NAND flash, a flexible disk, an optical disk, a compact disk, a Blu-ray (registered trademark) disk, or a DVD.

The communication interface 13 is a device including a receiver that receives data and a transmitter that transmits data. The communication interface 13 is specifically a communication chip or a network interface card (NIC), for example.

The sensor interface 14 is a device for connecting devices such as a speed pulse sensor 101, an acceleration sensor 102, and a GPS receiver 103. The sensor interface 14 is specifically a sensor electronic control unit (ECU), for example.

The position estimation apparatus 10 includes an acquisition unit 21 and an estimation unit 22 as a functional configuration. The estimation unit 22 includes a primary estimation part 221, a probability calculation part 222, and a secondary estimation part 223. The function of each of the acquisition unit 21, the estimation unit 22, the primary estimation part 221, the probability calculation part 222, and the secondary estimation part 223 is implemented in software.

The storage 122 in the storage device 12 stores a program for implementing the function of each unit or pan of the position estimation apparatus 10. The program is loaded into the memory 121 by the processor 11 to be executed by the processor 11. As a result, the function of each unit or part of the position estimation apparatus 10 is implemented.

Information, data, a signal value, and a variable value representing a result of functional processing of each unit or part implemented by the processor 11 are stored in the memory 121 or the register or cache memory in the processor 11. The following description assumes that the information, the data, the signal value, and the variable value representing the result of the functional processing of each unit or part implemented by the processor 11 are stored in the memory 121.

The program executed by the processor 11 to implement each function is stored in the storage device 12 in the above description. The program may however be stored in a portable storage medium such as a magnetic disk, a flexible disk, an optical disk, a compact disk, a Blu-ray (registered trademark) disk, or a DVD.

FIG. 1 illustrates only one processor 11. However, a plurality of the processors 11 may be included to execute the program implementing each function in coordination with one another \*\*\*Description of Operation\*\*\*

The operation of the position estimation apparatus 10 according to the first embodiment will be described with reference to FIGS. 1 to 5.

The operation of the position estimation apparatus 10 according to the first embodiment corresponds to a position estimation method according to the first embodiment. The operation of the position estimation apparatus 10 according to the first embodiment also corresponds to processing of a position estimation program according to the first embodiment.

Figure 2:
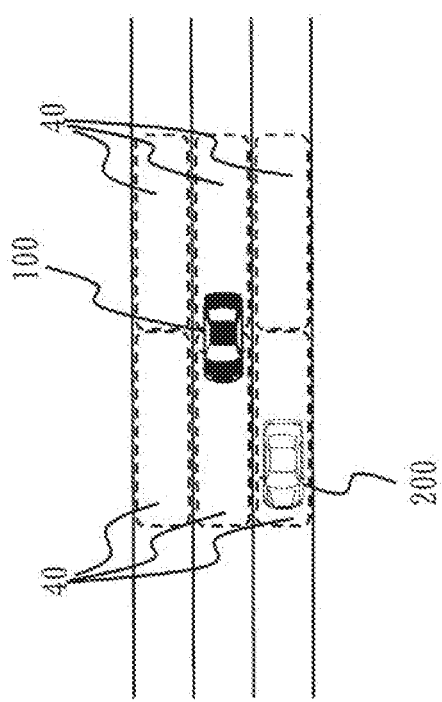
FIG. 2 is an illustrative diagram of the overview of the operation of the position estimation apparatus 10 according to the first embodiment.

The overview of the operation of the position estimation apparatus 10 according to the first embodiment will be described with reference to FIGS. 1 and 2.

The acquisition unit 21 acquires target information 31 regarding the position of the target body 100 from a device connected via the sensor interface 14 while the target body 100 is on the move. The acquisition unit 21 acquires neighboring information 32 regarding the position of a neighboring body 200 via the communication interface 13, the information being transmitted from the neighboring body 200 which is on the move near the target body 100 and is a movable body different from the target body 100.

The primary estimation part 221 estimates a relative position indicating a relative positional relationship between the target body 100 and the neighboring body 200 from the target information 31 and the neighboring information 32 acquired by the acquisition unit 21. The primary estimation part 221 then determines a relative area 40 corresponding to the estimated relative position as a primary area 41 among a plurality of relative areas 40 obtained by dividing the area around the target body 100.

The probability calculation part 222 calculates a probability of presence 43 of the neighboring body 200 in each relative area 40 from a plurality of the primary areas 41 determined within a reference period by the primary estimation part 221. The secondary estimation part 223 then determines, as a secondary area 44, the relative area 40 in which the neighboring body 200 is estimated to be present on the basis of the probability of presence calculated by the probability calculation part 222.

The details of the operation of the position estimation apparatus 10 according to the first embodiment will be described with reference to FIGS. 1 and 3.

Figure 3:
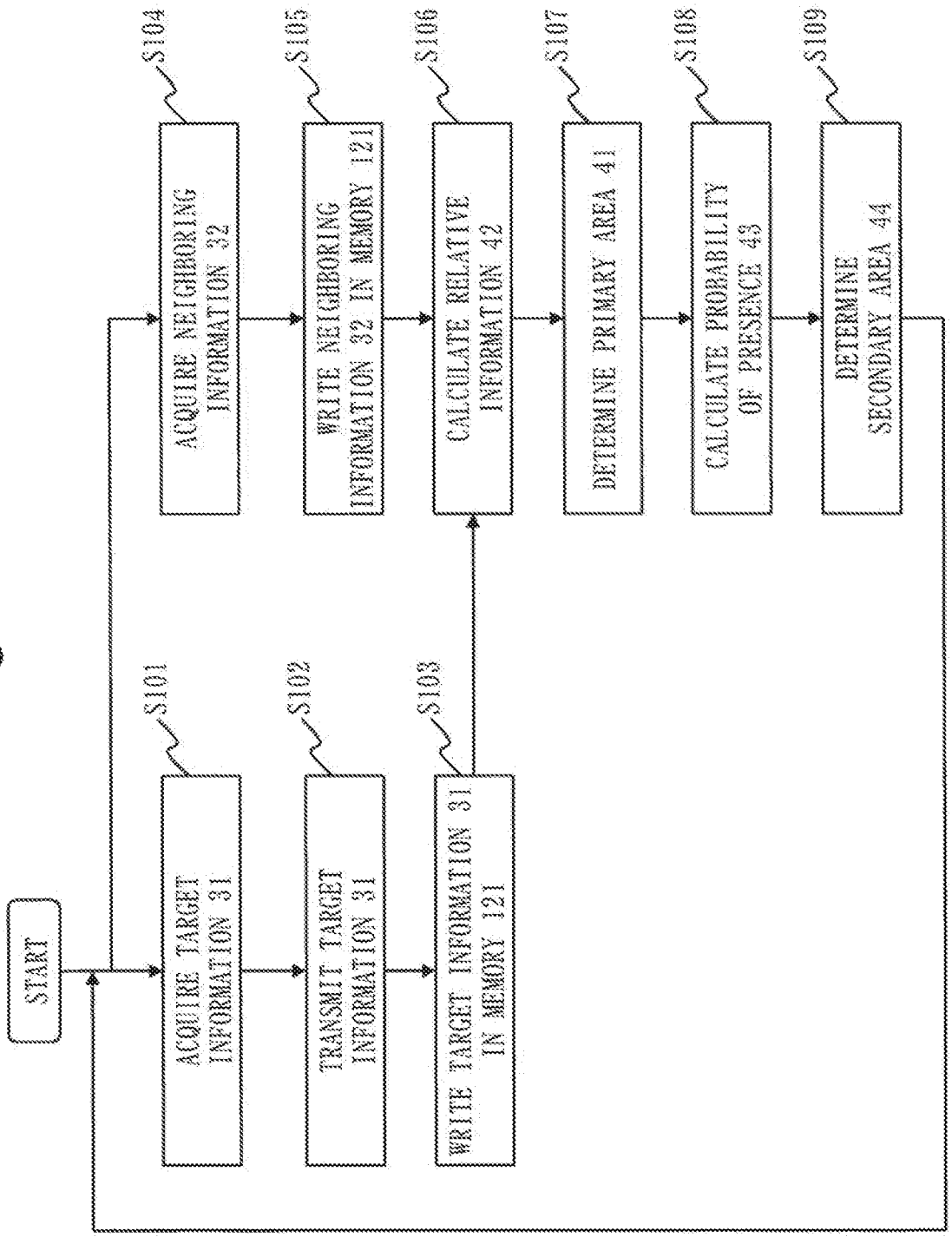
FIG. 3 is a flowchart illustrating the operation of the position estimation apparatus 10 according to the first embodiment.

The processings illustrated in FIG. 3 are executed repeatedly at regular intervals until the processings are no longer required. Note that the processings illustrated in FIG. 3 may be executed in response to the occurrence of an event instead of being repeated at regular intervals.

In object information acquisition processing of step S101, the acquisition unit 21 acquires the target information 31 regarding the position of the target body 100 from a device connected via the sensor interface 14 while the target body 100 is on the move.

Specifically, the acquisition unit 21 in the first embodiment receives, via the sensor interface 14, the target information 31 including speed information indicating the speed of the target body 100 detected by the speed pulse sensor 101, acceleration information indicating the acceleration of the target body 100 detected by the acceleration sensor 102, and position information indicating the position of the target body 100 received by the GPS receiver 103.

Note that the acquisition unit 21 may also acquire information from a device not illustrated such as a braking ECU or electric power steering (EPS).

In object information transmission processing of step S102, the acquisition unit 21 transmits the target information 31 acquired in step S01 to the neighboring body 200 via the communication interface 13 together with the time of acquisition of the information and an identifier of the target body 100. As a result, a device mounted on the neighboring body 200 can use the target information 31 of the target body 100.

In object information storage processing of step S103, the acquisition unit 21 writes the target information 31 acquired in step S101 into the memory 121 together with the time of acquisition of the information and the identifier of the target body 100.

The acquisition unit 21 may manage the target information 31 by using a database management system or a structured English query language (SQL).

In neighboring information acquisition processing of step S104, the acquisition unit 21 acquires the neighboring information 32 from the neighboring body 200.

Specifically, the neighboring body 200 in the first embodiment transmits the neighboring information 32 including speed information indicating the speed of the neighboring body 200, acceleration information indicating the acceleration of the neighboring body 200, and position information indicating the position of the neighboring body 200 together with the time of acquisition of the information and an identifier of the neighboring body 200. The acquisition unit 21 then receives the transmitted neighboring information 32 together with the time and the identifier via the communication interface 13.

In neighboring information storage processing of step S105, the acquisition unit 21 writes the neighboring information 32 acquired in step S104 into the memory 121 together with the time of acquisition of the information and the identifier of the neighboring body 200.

As with the target information 31, the acquisition unit 21 may manage the neighboring information 32 by using a database management system or SQL.

In relative information calculation processing of step S106, the primary estimation part 221 reads the target information 31 written in step S103 and the neighboring information 32 written in step S105 from the memory 121.

The primary estimation part 221 calculates relative information 42 which can identify the relative position between the target body 100 and the neighboring body 200 from the target information 31 and the neighboring information 32 being read. Specifically, the primary estimation part 221 calculates a relative distance and a relative orientation as the relative information 42. The primary estimation part 221 calculates the relative distance by calculating the distance between the position indicated by the position information of the target body 100 and the position indicated by the position information of the neighboring body 200. The primary estimation part 221 further calculates the relative orientation by calculating the orientation from the position indicated by the position information of the target body 100 to the position indicated by the position information of the neighboring body 200. The primary estimation part 221 writes the calculated relative information 42 in the memory 121. The relative orientation is based on the forward direction of the vehicle being the object, for example, but may be based on another direction.

In primary area determination processing of step S107, on the basis of the relative information 42 calculated in step S106, the primary estimation part 221 determines the relative area 40 in which the neighboring body 200 is estimated to be present as the primary area 41 among the plurality of relative areas 40 obtained by dividing the area around the target body 100.

Specifically, the primary estimation part 221 reads the relative information 42 calculated in step S106 from the memory 121. Then, on the basis of the relative information 42, the primary estimation part 221 identifies the relative position which is the position of the neighboring body 200 with respect to the target body 100, and determines the relative area 40 including the identified relative position as the primary area 41. That is, the primary estimation part 221 determines the relative area 40 including the relative position identified from the relative distance and the relative orientation as the primary area 41. The primary estimation part 221 writes the primary area 41 being determined in the memory 121.

In probability of presence calculation processing of step S108, the probability calculation part 222 calculates the probability of presence 43 of the neighboring body 200 in each relative area 40 from the plurality of primary areas 41 determined in step S107 within the past reference period.

Specifically, the probability calculation part 222 reads the plurality of primary areas 41 stored within the past reference period from the memory 121. The probability calculation part 222 calculates the probability of presence 43 by P=A/N for each relative area 40 on the basis of the plurality of primary areas 41 being read. Here, "P" represents the probability of presence 43 of the relative area 40 to be calculated. "A" represents the number of times the relative area 40 subjected to calculation within the past reference period is determined as the primary area 41. "N" represents the total number of times the primary area 41 is determined in step S107 within the past reference period.

As for the reference period, an appropriate period varies depending on information such as the type of road including a freeway and a general road the vehicle being the target body 100 is on, or the speed of the target body 100. The reference period is thus determined beforehand in accordance with the information such as the type of road and the speed. For example, the reference period is determined on the basis of a value set in a program of the apparatus. Alternatively, the position estimation apparatus 10 equipped with a learning function (not illustrated) performs optimization in accordance with the operation of the position estimation apparatus 10 to determine the reference period. Still alternatively, for example, the reference period may be acquired from the outside via the communication interface 13 while the vehicle being the target body 100 is moving. Still alternatively, the reference period may be a period from the start of communication with the neighboring body 200 to the present.

In secondary area determination processing of step S109, the secondary estimation part 223 determines the relative area 40 in which the neighboring body 200 is estimated to be present as the secondary area 44 on the basis of the probability of presence 43 calculated in step S108.

Specifically, the secondary estimation part 223 reads the probability of presence 43 calculated in step S108 from the memory 121, and determines the relative area 40 with the highest probability of presence 43 as the secondary area 44 in which the neighboring body 200 is estimated to be present.

Note that in steps S102 and S104, the acquisition unit 21 may perform communication by using a communication protocol such as Dedicated Short Range Communication (DSRC) or IEEE 802.11p dedicated to vehicle communication, or by using a mobile phone network such as Long Term Evolution (LTE) or 3G. Alternatively, the acquisition unit 21 may perform communication by using a wireless LAN such as Bluetooth (registered trademark) or IEEE 802.11a/b/g/n. Still alternatively, the acquisition unit 21 may be adapted to either one of the mobile phone network and the wireless LAN, or may be adapted to both the mobile phone network and the wireless LAN to use them switchably or simultaneously. The acquisition unit 21 may also perform communication with the neighboring body 200 directly or through a facility such as a roadside unit or a base station.

The relative area 40 according to the first embodiment will be described with reference to FIG. 4.

Figure 4:
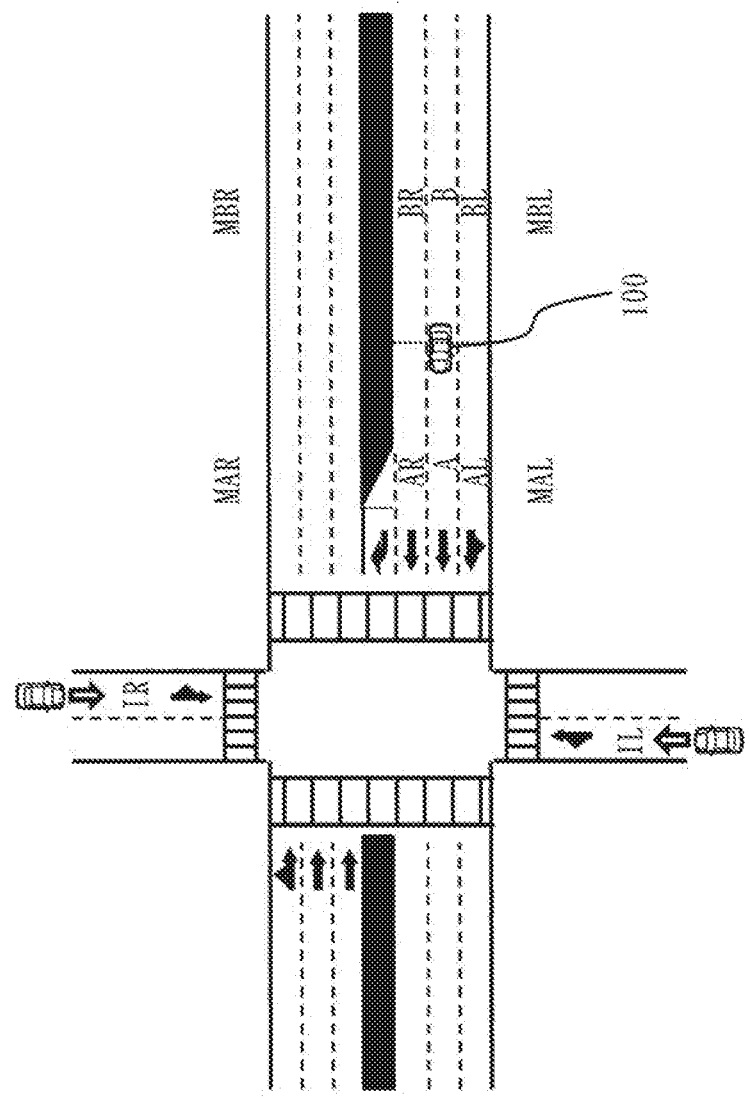
FIG. 4 is an illustrative diagram of a relative area 40 according to the first embodiment.

FIG. 4 illustrates the vicinity of an intersection. Moreover, FIG. 4 assumes that the front side of the vehicle being the target body 100 faces the intersection.

The relative area 40 is a plurality of areas obtained by dividing the area around the target body 100 which is the movable body equipped with the position estimation apparatus 10.

In FIG. 4, the relative area 40 is defined as an area A (Ahead), an area AL (Ahead Left), an area AR (Ahead Right), an area MAL (More Ahead Left), an area MAR (More Ahead Right), an area B (Behind), an area BL (Behind Left), an area BR (Behind Right), an area MBL (More Behind Left), an area MBR (More Behind Right), an area IL, (Intersecting Left), and an area IR (Intersecting Right).

The relative area 40 may be set by another division method such as further dividing the areas illustrated in FIG. 4.

In FIG. 4, the area A is an area in front of the position of the target body 100 in a lane where the target body 100 travels. The area AL is an area in front of the position of the target body 100 in a lane immediately to the left of the lane of the target body 100. The area AR is an area in front of the position of the target body 100 in a lane immediately to the right of the lane of the target body 100. The area MAL is an area in front of the position of the target body 100 in a lane that is two or more lanes to the left of the lane of the target body 100. The area MAR is an area in front of the position of the target body 100 in a lane that is two or more lanes to the right of the lane of the target body 100.

The area B is an area behind the position of the target body 100 in the lane where the target body 100 travels. The area BL is an area behind the position of the target body 100 in the lane immediately to the left of the lane of the target body 100. The area BR is an area behind the position of the target body 100 in the lane immediately to the right of the lane of the target body 100. The area MBL is an area behind the position of the target body 100 in the lane that is two or more lanes to the left of the lane of the target body 100. The area MBR is an area behind the position of the target body 100 in the lane that is two or more lanes to the right of the lane of the target body 100.

The area IL is an area of a road on the left side of the intersection in front of the target body 100. The area IR is an area of a road on the right side of the intersection in front of the target body 100.

Note that it may be difficult to distinguish the area IL from the area MAL and the area IR from the area MAR by the relative position alone. In this case, the primary estimation part 221 may identify the direction of travel of the neighboring body 200 from a change in the position of the neighboring body 200 during the reference period and then distinguish the area IL from the area MAL and the area IR and the area MAR on the basis of the direction of travel being identified.

Figure 5:
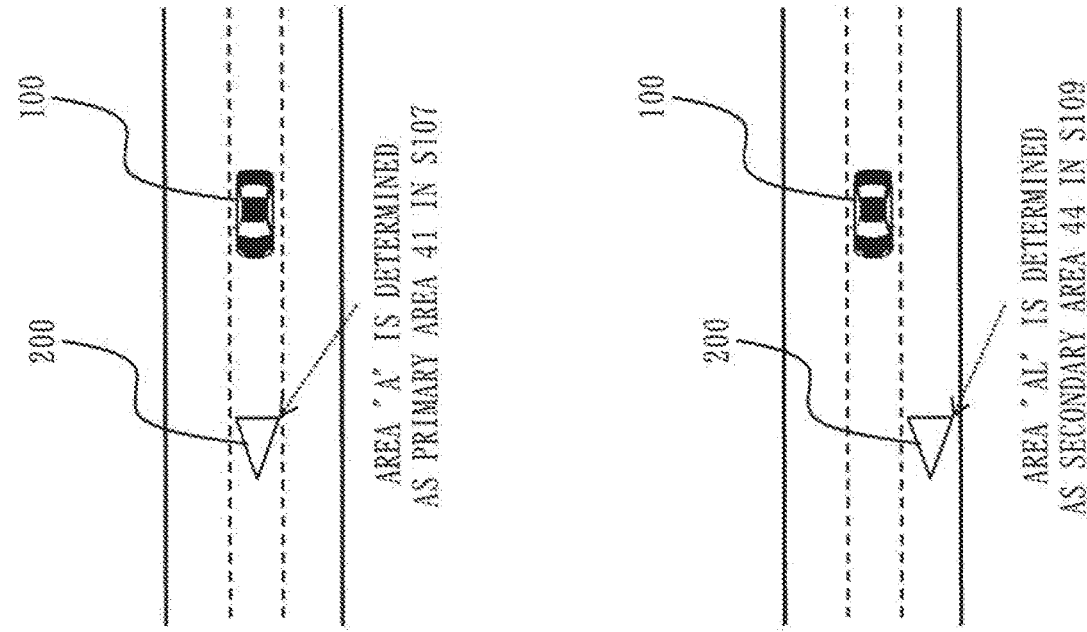
FIG. 5 is an illustrative diagram of a specific example of the operation of the position estimation apparatus 10 according to the first embodiment.

A specific example of the operation of the position estimation apparatus 10 according to the first embodiment will be described with reference to FIG. 5.

Prior to the execution of step S107, as illustrated in table 1, the number of times (=A) the respective relative areas 40 are determined as the primary area 41 within the reference period are: one time for the area A; seven times for the area AL; one time for the area AR; and never for the other areas.

It is assumed in step S107 that the area A is determined as the primary area 41. In other words, it is assumed in step S107 that the neighboring body 200 is traveling ahead of the target body 100 in the same lane as the lane where the object travels. During this time, it is assumed that the other relative areas 40 are never determined as the primary area 41. Then, as illustrated in table 2, one is added to the number of times the area A is determined as the primary area 41. In other words, the area A is determined as the primary area 41 twice, the area AL is determined as the primary area 41 seven times, and the area AR is determined as the primary area 41 once within the past reference period. The total number of times (=N) the primary area 41 is determined within the past reference period now equals ten.

In step S108, the probability of presence 43 is calculated to be 2/10 for the area A, 7/10 for the area AL, and 1/10 for the area AR. The area AL is thus determined as the secondary area 44 in step S109, whereby the neighboring body 200 is assumed to be traveling in the area AL. In other words, the neighboring body 200 is assumed to be traveling in the area AL that is different from the area (=area A) estimated from the target information 31 and the neighboring information 32 acquired most recently.

Note that the above description assumes the case where only one neighboring body 200 is present. However, a plurality of the neighboring bodies 200 may be present around the target body 100. When a plurality of the neighboring bodies 200 is present, the processings illustrated in FIG. 3 are executed for each neighboring body 200 to determine the secondary area 44 for each neighboring body 200.

Moreover, in the above description, the target information 31 and the neighboring information 32 each include the information such as the speed information, the acceleration information, and the position information.

Information exchanged between the movable bodies can be used as the target information 31 and neighboring information 32. The information exchanged between the movable bodies may be standardized in each country. Specifically, Japan has definitions for application data in the experimental guideline ITS FORUM RC-005 for standardization. Moreover, the United States has Basic Safety Message (BSM) standardized by SAE J2735. Furthermore, Europe has Cooperative Awareness Message (CAM) standardized by ETSI EN 302 637-2.

These pieces of standardized information include time of reception, a vehicle identifier, latitude, longitude, an altitude, speed, an orientation indicating the direction of travel, a steering angle, lateral acceleration, longitdtdinal acceleration, vertical acceleration, a yaw rate, a brake control state, and a vehicle size. The target information 31 and the neighboring information 32 may thus include these pieces of information.

Effects of First Embodiment

As described above, the position estimation apparatus 10 according to the first embodiment calculates the probability of presence 43 of the neighboring body 200 in each relative area 40 from the primary areas 41 determined within the past reference period. The position estimation apparatus 10 then determines the relative area 40 in which the neighboring body 200 is estimated to be present as the secondary area 44 on the basis of the probability of presence 43 being calculated. As a result, the relative positional relationship between the target body 100 and the neighboring body 200 can be accurately estimated.

The position indicated by the target information 31 and the neighboring information 32 will be described with reference to FIG. 6.

Figure 6:
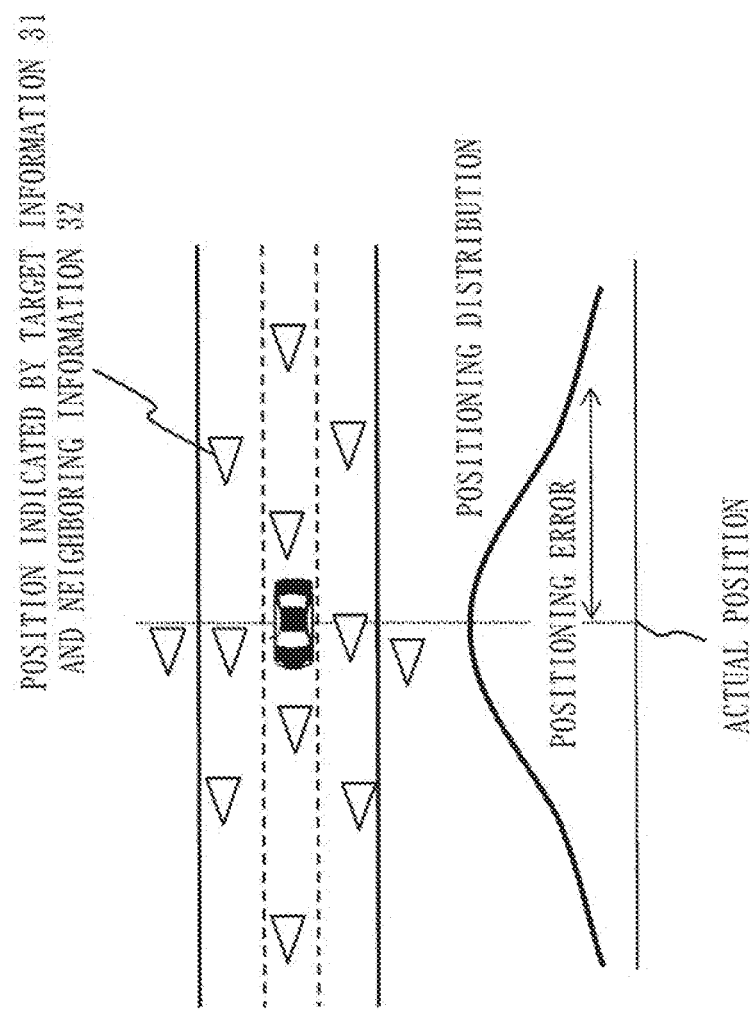
FIG. 6 is an illustrative diagram of the position indicated by target information 31 and neighboring information 32.

In FIG. 6, a vehicle indicates an actual position of the target body 100 on the road, and a triangle indicates a position possibly indicated by the target information 31 and the neighboring information 32. FIG. 6 illustrates the position error to be distributed along a normal distribution.

The position indicated by the target information 31 and the neighboring information 32 is a position indicated by position information acquired using a positioning satellite such as a GPS or GNSS. The position indicated by the position information includes errors due to a signal delay in the ionosphere, a multipath caused by buildings, and a system delay. Thus, the position indicated by the target information 31 and the neighboring information 32 may possibly deviate from the actual position of the target body 100.

Specifically, the target information 31 and the neighboring information 32 possibly indicate that the target body 100 is in a lane different from the actual position of the target body 100. Moreover, the target information 31 and the neighboring information 32 possibly indicate that the target body 100 is in front of or behind the actual position of the object in the direction of travel thereof.

The relative position between the target body 100 and the neighboring body 200 will be described with reference to FIG. 7.

Figure 7:
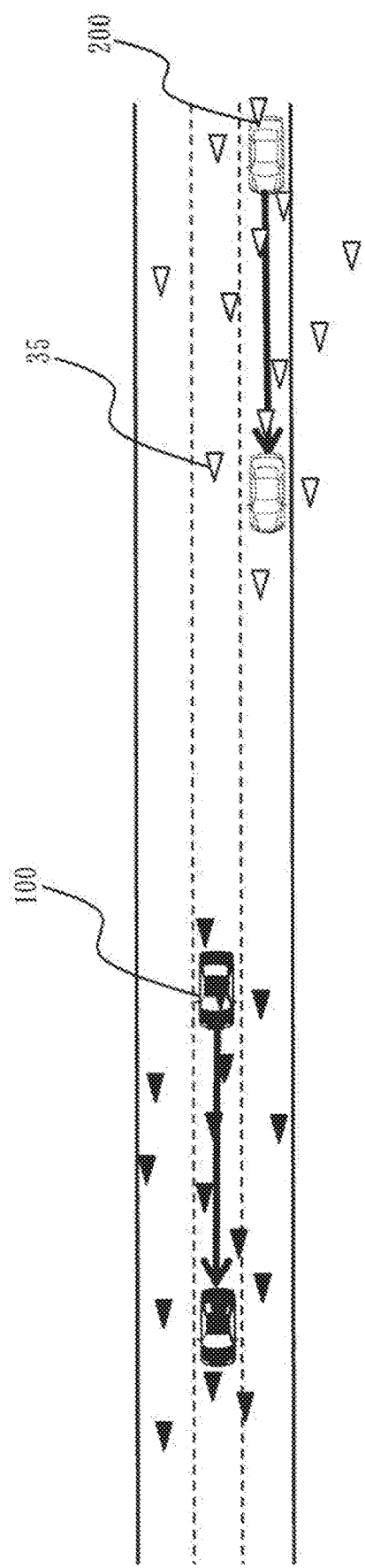
FIG. 7 is an illustrative diagram of a relative position between a target body 100 and a neighboring body 200.

In FIG. 7, vehicles indicate the actual positions of the target body 100 and the neighboring body 200, a filled triangle indicates the position indicated by the target information 31, and a hollow triangle indicates the position indicated by the neighboring information 32.

As described with reference to FIG. 6, the position of the target body 100 indicated by the target information 31 and the position of the neighboring body 200 indicated by the neighboring information 32 include errors and thus possibly deviate from the actual positions. As a result, the positions indicated by the target information 31 and the neighboring information 32 possibly indicate that the target body 100 and the neighboring body 200 travel in the same lane though the target body 100 and the neighboring body 200 actually travel in different lanes. That is, in the case of FIG. 7, the neighboring information 32 indicating position 35 as the position of the neighboring body 200 results in the indication that the target body 100 and the neighboring body 200 are in the same lane though the target body 100 and the neighboring body 200 actually travel at the positions indicated by the vehicles.

However, the position estimation apparatus 10 according to the first embodiment makes a final determination of the most recent relative position on the basis of the relative position estimated in the past. A correct relative position can be estimated even when the positions indicated by the target information 31 and the neighboring information 32 temporarily deviate from the actual positions due to the errors. Note that a large deviation in the relative position between the target body 100 and the neighboring body 200 is temporary in many cases.

\*\*\*Other Configurations\*\*\*

<First Variation>

The first embodiment executes the processings from step S101 to step S109 of FIG. 3 in synchronization. As a first variation, the processings from step S101 to step S103, the processings from step S104 to step S105, and the processings from step S106 to step S109 may be executed asynchronously.

Figure 8:
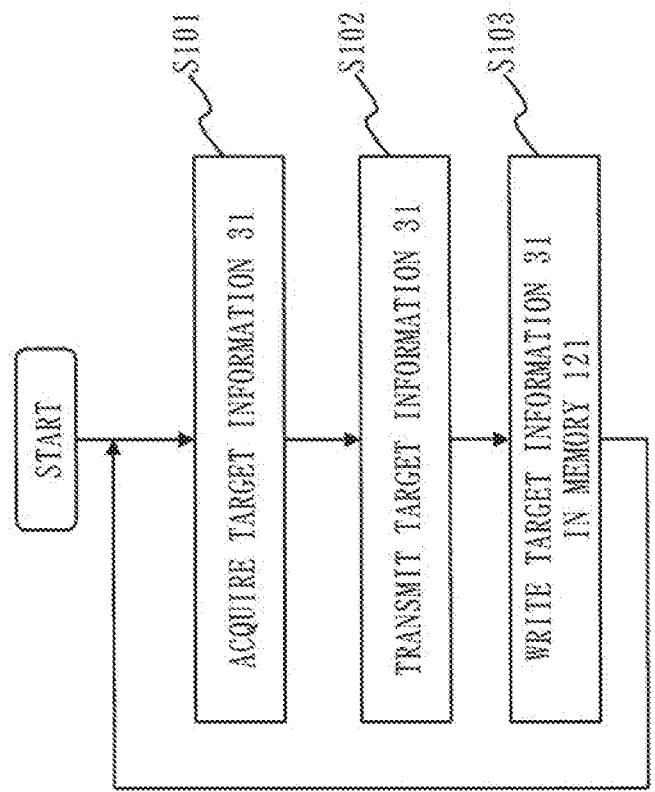
FIG. 8 is a flowchart illustrating the operation of a position estimation apparatus 10 according to a first variation.
Figure 9:
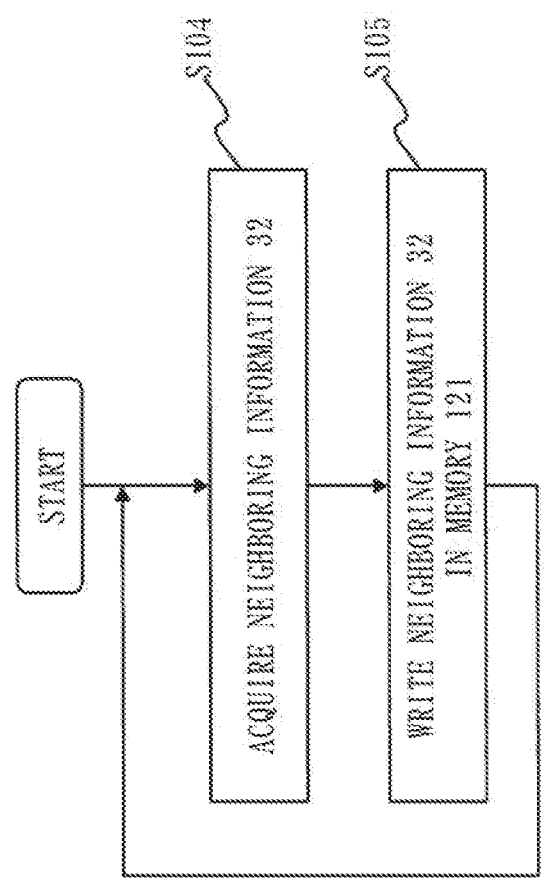
FIG. 9 is a flowchart illustrating the operation of the position estimation apparatus 10 according to the first variation.

That is, the processings from step S101 to step S103 are repeatedly executed at regular intervals as illustrated in FIG. 8. Moreover, as illustrated in FIG. 9, the processings from step S104 to step S105 are repeatedly executed at regular intervals asynchronously with the processings illustrated in FIG. 8. Furthermore, as illustrated in FIG. 10, the processings from step S106 to step S109 are repeatedly executed at regular intervals asynchronously with the processings illustrated in FIGS. 8 and 9.

Figure 10:
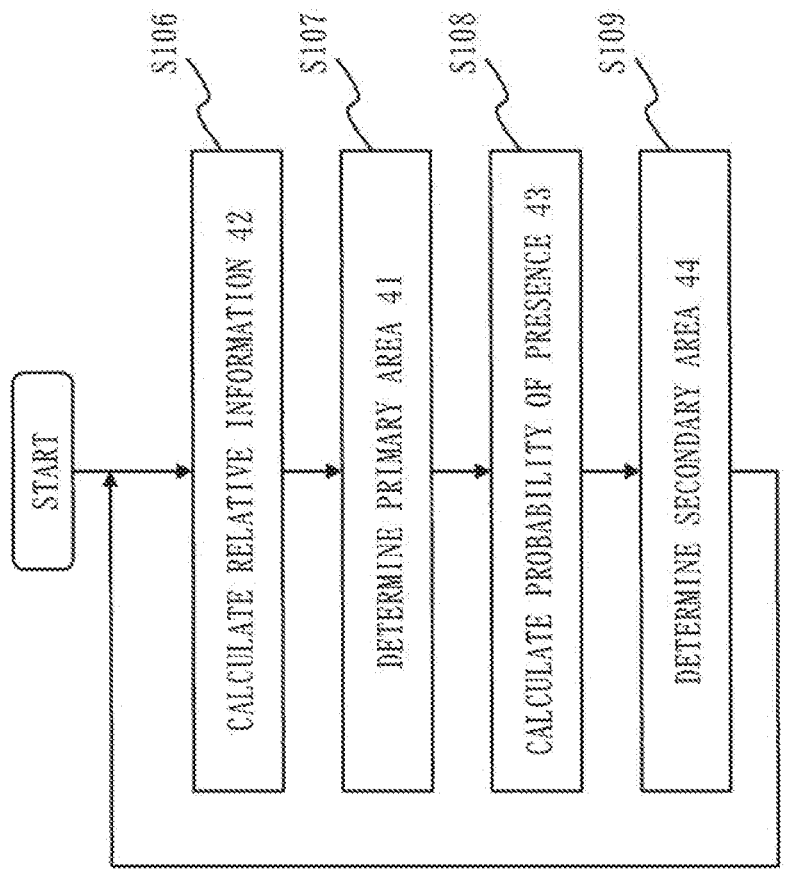
FIG. 10 is a flowchart illustrating the operation of the position estimation apparatus 10 according to the first variation.

In this case, in step S106 of FIG. 10, the primary estimation part 221 reads the latest neighboring information 32 and the target information 31 closest in time to the time of the neighboring information 32 being read.

<Second Variation>

The first embodiment estimates the relative area 40 in which the neighboring body 200 is present. As a second variation, the direction of travel of the neighboring body 200 may also be identified.

In this case, in step S106, the primary estimation part 221 reads the neighboring information 32 acquired within a reference period and identifies the direction of travel of the neighboring body 200 from the neighboring information 32 being read. Specifically, the direction of travel of the neighboring body 200 is identified from a change in the position indicated by the past neighboring information 32. Alternatively, when the orientation is included in the neighboring information 32, a direction indicated by the orientation may be identified as the direction of travel of the neighboring body 200.

Identifying the direction of travel enables a determination as to whether the neighboring body 200 in the area in front of the target body 100 such as in the area A, the area AL, or the area AR is moving in the same direction as the target body 100 is or toward the target body 100. When the neighboring body 200 is moving toward the target body 100, a risk of collision increases even if the target body 100 and the neighboring body 200 are far from each other. Identifying the direction of travel can thus more accurately determine the risk of collision, for example.

<Third Variation>

The first embodiment implements the function of each part of the position estimation apparatus 10 in software. As a third variation, the function of each part of the position estimation apparatus 10 may be implemented in hardware. The third variation will be described focusing on a difference from the first embodiment.

Figure 11:
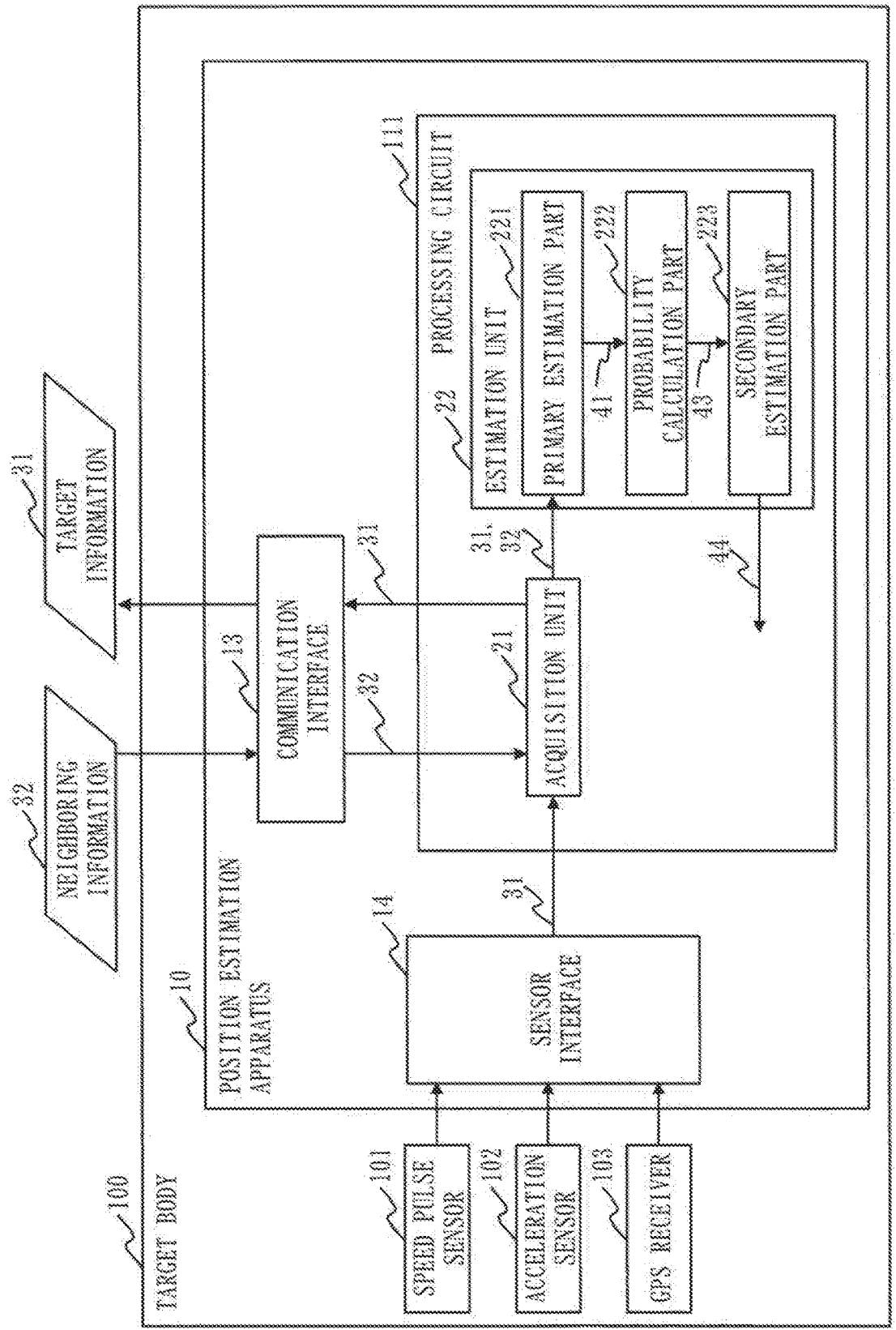
FIG. 11 is a block diagram of a position estimation apparatus 10 according to a third variation.

The configuration of the position estimation apparatus 10 according to the third variation will be described with reference to FIG. 11.

When the function of each part is implemented in hardware, the position estimation apparatus 10 includes the communication interface 13, the sensor interface 14, and a processing circuit 111. The processing circuit 111 is a dedicated electronic circuit for implementing the function of each part of the position estimation apparatus 10 and the function of the storage device 12.

The processing circuit 111 can be a single circuit, a composite circuit, a programmed processor, a parallel programmed processor, a logic IC, a gate array (GA), an application specific integrated circuit (ASIC), or a field-programmable gate array (FPGA).

The function of each part may be implemented by one processing circuit 111 or distributed into a plurality of the processing circuits 111 to be implemented.

<Fourth Variation>

As a fourth variation, some functions may be implemented in hardware while other functions may be implemented in software. That is, among the units of the position estimation apparatus 10, some functions may be implemented in hardware while other functions may be implemented in software.

The processor 11, the storage device 12, and the processing circuit 111 are collectively referred to as "processing circuitry". That is, the function of each unit is implemented by the processing circuitry regardless of the configuration of the position estimation apparatus 10 illustrated in either FIG. 1 or 11.

Second Embodiment

A second embodiment is different from the first embodiment in that a probability of presence 43 is weighted on the basis of a history of a change in the relative position in the past. This difference will be described in the second embodiment.

\*\*\*Description of Configuration\*\*\*

The configuration of a position estimation apparatus 10 according to the second embodiment will be described with reference to FIG. 12.

The position estimation apparatus 10 includes a weighting part 224 in addition to the functional configuration illustrated in FIG. 1. The function of the weighting part 224 is implemented in software.

A storage 122 stores a program for implementing the function of the weighting part 224. The program is loaded into a processor 11 to be executed by the processor 11. The function of the weighting part 224 is thus implemented.

\*\*\*Description of Operation\*\*\*

The operation of the position estimation apparatus 10 according to the second embodiment will be described with reference to FIGS. 12 to 20.

The operation of the position estimation apparatus 10 according to the second embodiment corresponds to a position estimation method according to the second embodiment. The operation of the position estimation apparatus 10 according to the second embodiment also corresponds to processing of a position estimation program according to the second embodiment.

The overview of the operation of the position estimation apparatus 10 according to the second embodiment will be described with reference to FIGS. 12 and 13.

As described in the first embodiment, a probability calculation part 222 calculates the probability of presence 43 of a neighboring body 200 in each relative area 40.

Then, the weighting part 224 weights the probability of presence 43 for at least some of the relative areas 40 among a plurality of the relative areas 40 on the basis of a change in the relative position estimated over time $T=t_1, t_2$, and the like. As a specific example, when the neighboring body 200 is recognized to be traveling while following a target body 100, the neighboring body 200 is highly likely to be traveling in the same lane as the lane of the target body 100 therebehind. The probability of presence 43 in an area B is thus increased. Moreover, the probability of presence 43 in each of areas BL and BR is decreased because the neighboring body is less likely to be traveling in an adjacent lane.

A secondary estimation part 223 then determines a secondary area 44 on the basis of a weighted probability 45 that is the probability of presence 43 weighted by the weighting part 224.

The details of the operation of the position estimation apparatus 10 according to the second embodiment will be described with reference to FIGS. 12 and 14.

Figure 14:
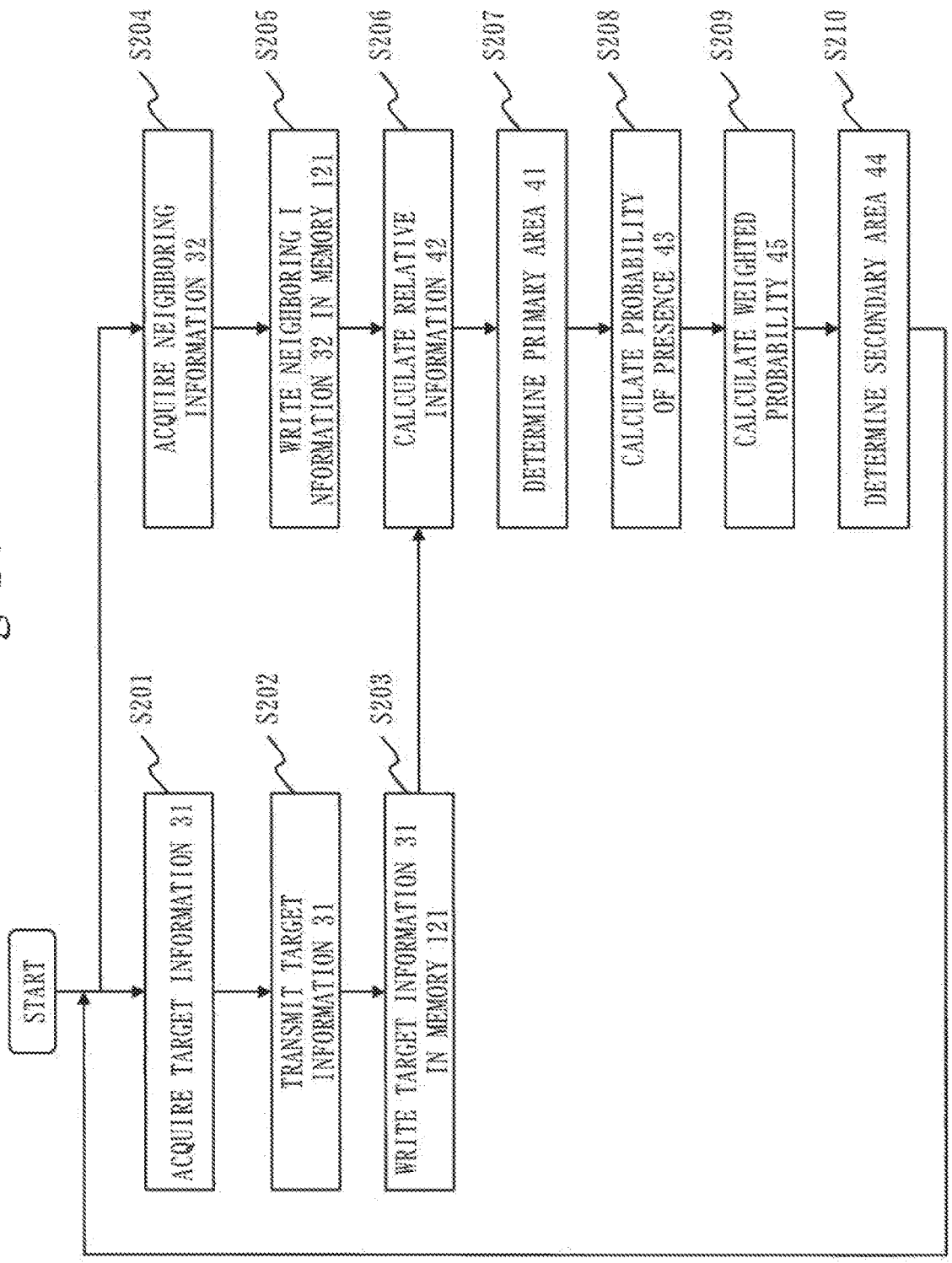
FIG. 14 is a flowchart illustrating the operation of the position estimation apparatus 10 according to the second embodiment.

The processings illustrated in FIG. 14 are executed repeatedly at regular intervals until the processings are no longer required. Note that, as with the processings illustrated in FIG. 3, the processings illustrated in FIG. 14 may be executed on an event-driven basis instead of being repeated at regular intervals.

The processings from step S201 to step S205 are the same as the processings from step S101 to step S105 in FIG. 3. Moreover, the processings from step S207 to step S208 are the same as the processings from step S107 to step S108 in FIG. 3.

As in the first embodiment, in relative information calculation processing of step S206, a primary estimation part 221 calculates a relative distance and a relative orientation as relative information 42. The primary estimation part 221 further calculates relative speed as the relative information 42. The primary estimation part 221 calculates the relative speed by calculating a difference in speed indicated by speed information on the target body 100 and the neighboring body 200.

In weighting processing of step S209, the weighting part 224 reads, from a memory 121, the relative information 42 calculated in step S206 during a past reference period. The weighting part 224 further reads the probability of presence 43 calculated in step S208 from the memory 121. The weighting part 224 then identifies a change in the relative position between the target body 100 and the neighboring body 200 or the like from the relative information 42 being read, and calculates the weighted probability 45 by weighting the probability of presence 43 in at least some of the relative areas 40. The weighting part 224 writes the weighted probability 45 being calculated in the memory 121.

In secondary area determination processing of step S210, the secondary estimation part 223 determines the relative area 40 in which the neighboring body 200 is estimated to be present as the secondary area 44 on the basis of the weighted probability 45 calculated in step S209.

Specifically, the secondary estimation part 223 reads the weighted probability 45 calculated in step S209 from the memory 121, and determines the relative area 40 with the highest weighted probability 45 as the secondary area 44 in which the neighboring body 200 is estimated to be present.

Figure 15:
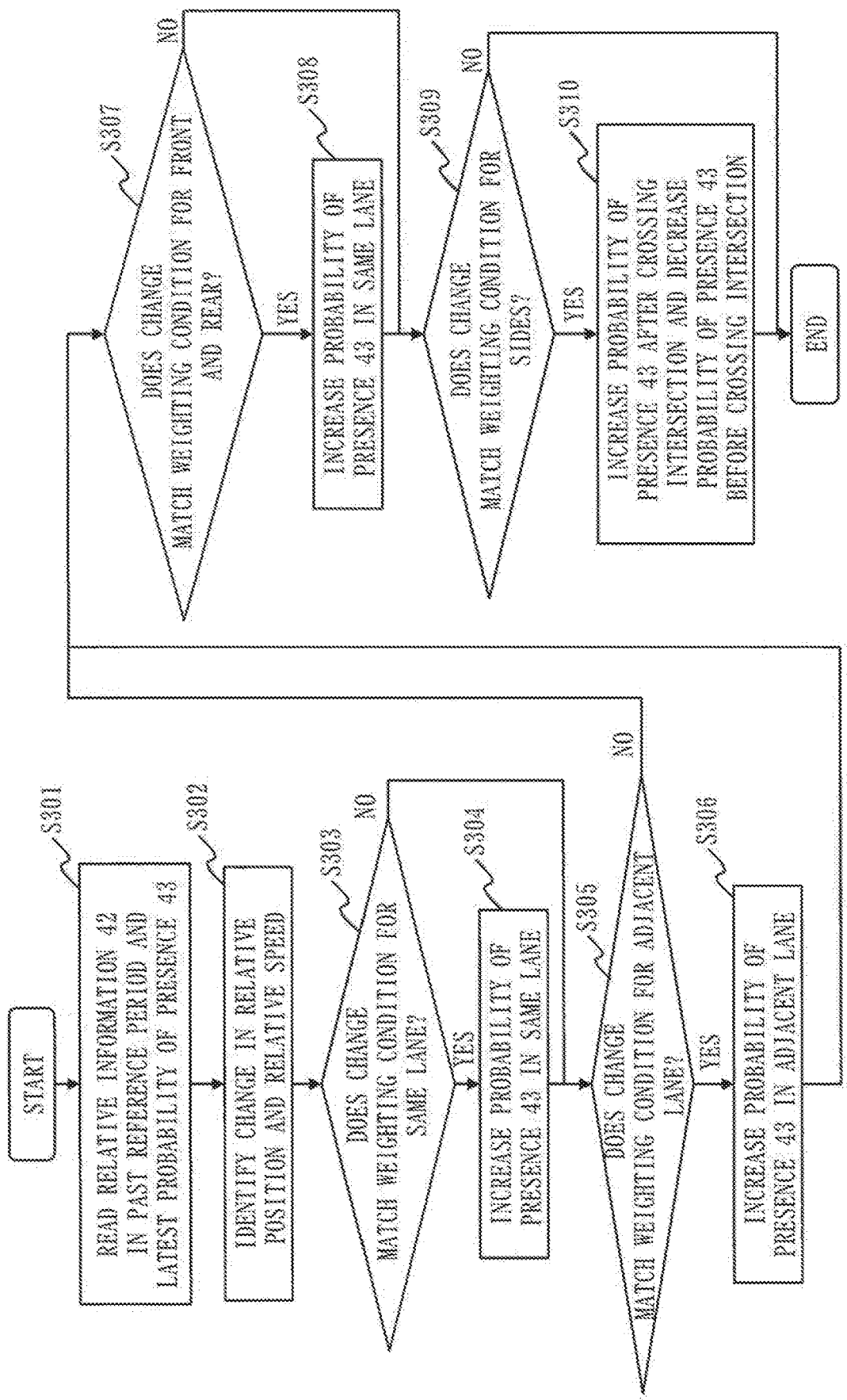
FIG. 15 is a flowchart illustrating weighting processing according to the second embodiment.

The weighting processing (step S209 in FIG. 14) according to the second embodiment will be described with reference to FIG. 15.

In information read processing of step S301, the weighting part 224 reads, from the memory 121, the relative information 42 calculated in step S206 during the past reference period. The weighting part 224 further reads the probability of presence 43 calculated in step S208 from the memory 121.

In change identification processing of step S302, the weighting part 224 identifies a change in the relative position between the target body 100 and the neighboring body 200 from the relative information 42 being read in step S301. Specifically, the change in the relative position is identified by calculating differences in the relative distance and the relative orientation in time series and then identifying changes in the relative distance and the relative orientation during the past reference period.

The weighting part 224 further identifies a change in the relative speed between the target body 100 and the neighboring body 200. Specifically, the weighting part 224 identifies the change in the relative speed during the past reference period by calculating a difference between the speed of the target body 100 and the speed of the neighboring body 200. The speed of the target body 100 is calculated from the position of the target body 100 in the past reference period and the time of acquisition of target information 31 indicating the position. Similarly, the speed of the neighboring body 200 is calculated from the position of the neighboring body 200 in the reference period and the time of acquisition of neighboring information 32 indicating the position.

In same lane determination processing of step S303, the weighting part 224 determines whether or not the change in the relative position identified in step S302 matches a weighting condition for the same lane.

Figure 16:
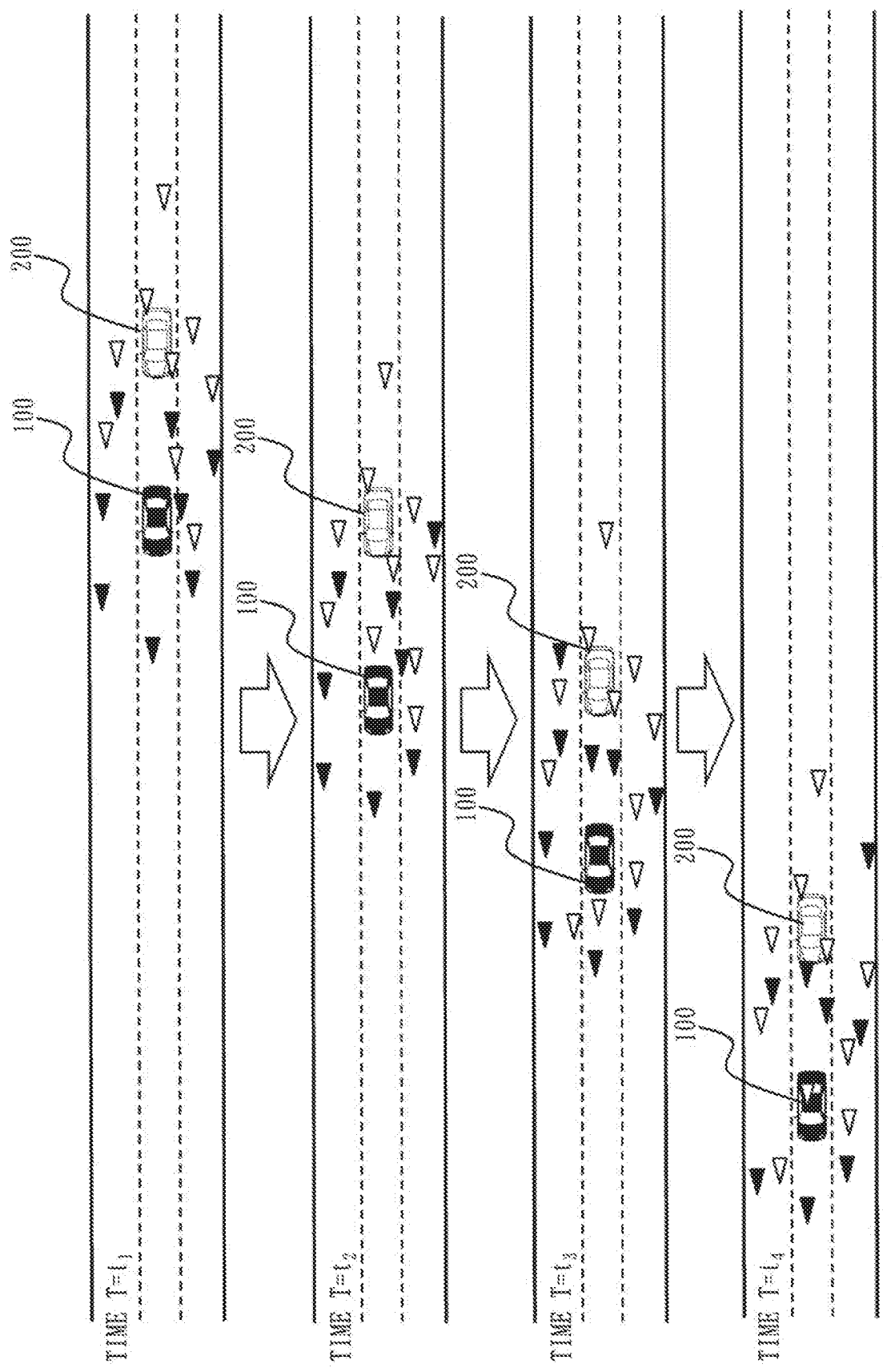
FIG. 16 is an illustrative diagram of a weighting condition for the same lane.

A specific description will be given with reference to FIG. 16. There is a case where a vehicle travels while following another vehicle. In such a case, as illustrated in FIG. 16, a relative position between the two vehicles does not change much as time T changes to $t_1$, $t_2$, $t_3$, and $t_4$. Moreover, the two vehicles in the above case often travel in the same lane.

Accordingly, the weighting part 224 determines that the target body 100 and the neighboring body 200 travel while one follows the other when the change in the relative position equals a reference value or less, or when the change in the relative position is small. When the change in the relative position equals the reference value or less, the weighting part 224 determines that the change matches the weighting condition for the same lane. As for the reference value, an appropriate value varies depending on information such as the type of road including a freeway and a general road on which the target body 100 travels, or the speed of the target body 100. The reference value is thus determined beforehand in accordance with the information such as the type of road or the speed.

The weighting part 224 advances the processing to step S304 to weight the probability of presence 43 if the change matches the weighting condition, or advances the processing to step S305 if the change does not match the weighting condition.

In same lane weighting processing of step S304, the weighting part 224 increases the probability of presence 43 in the relative area 40 corresponding to the same lane as the lane where the target body 100 travels among the plurality of relative areas 40, because the two vehicles are highly likely to be traveling in the same lane when one follows the other.

Specifically, the weighting part 224 increases the probability of presence 43 in the area A when the neighboring body 200 is in front of the target body 100. At this time, the weighting part 224 may lower the probability of presence 43 in each of the area B, the area BL, and the area BR in the rear. On the other hand, the weighting part 224 increases the probability of presence 43 in the area B when the neighboring body 200 is behind the target body 100. At this time, the weighting part 224 may lower the probability of presence 43 in each of the area A, the area AL, and the area AR in front.

The neighboring body 200 is in front of the target body 100 when the relative area 40 having the highest probability of presence 43 calculated in step S208 is any one of the area A, the area AL, the area AR, the area MAL, and the area MAR. The neighboring body 200 is behind the target body 100 when the relative area 40 having the highest probability of presence 43 calculated in step S208 is any one of the area B, the area BL, the area BR, the area MBL, and the area MBR.

In adjacent lane determination processing of step S305, the weighting part 224 determines whether or not the change in the relative position identified in step S302 matches a weighting condition for an adjacent lane.

Figure 17:
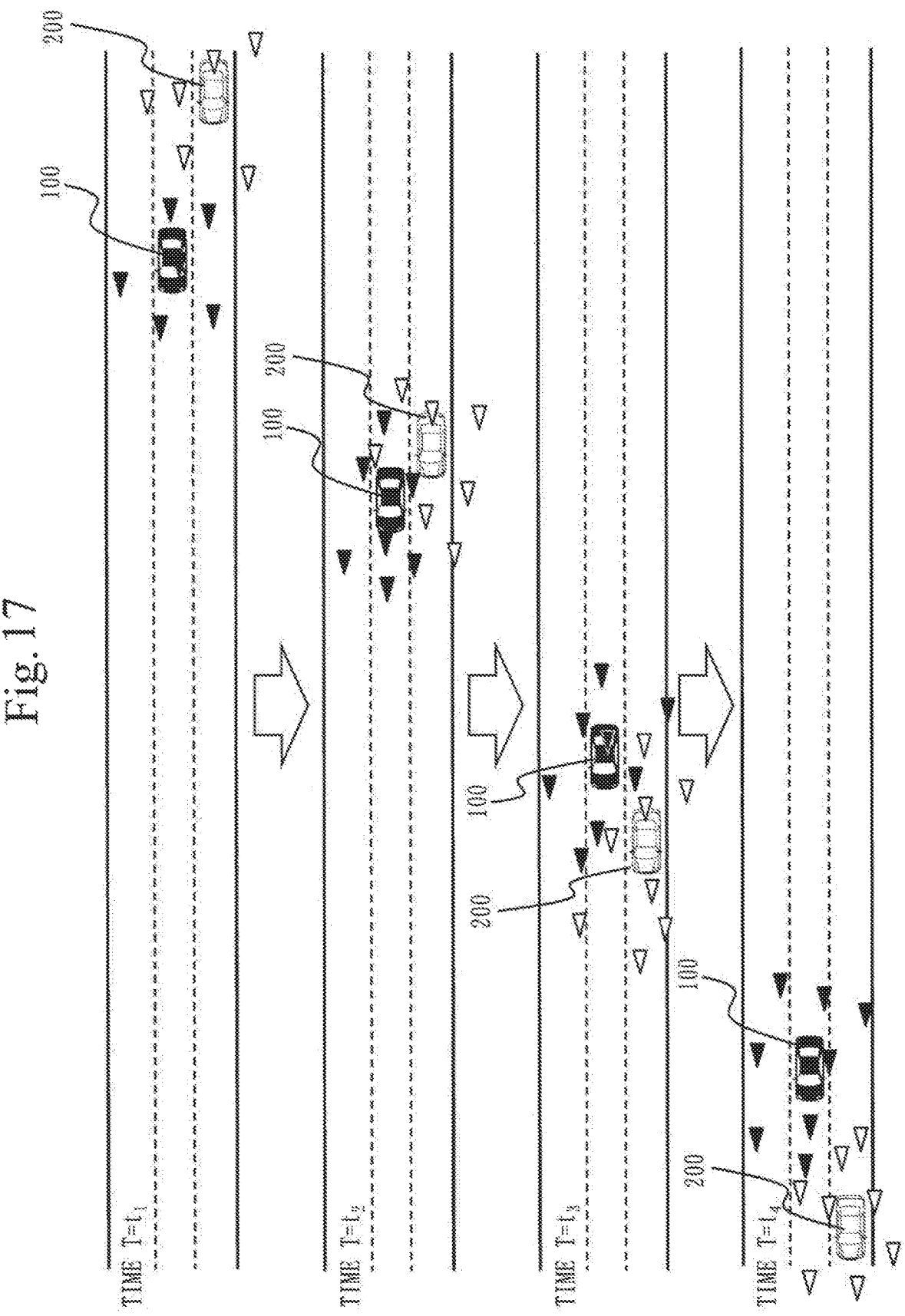
FIG. 17 is an illustrative diagram of a weighting condition for an adjacent lane.

A specific description will be given with reference to FIG. 17. There is a case where a vehicle passes another vehicle. In such a case, as time T changes to $t_1$, $t_2$, $t_3$, and $t_4$, the relative position between the two vehicles gradually decreases and thereafter gradually increases once a front and rear relationship between the two vehicles is reversed, as illustrated in FIG. 17. Moreover, the two vehicles in the above case travel in different lanes.

Accordingly, the weighting part 224 determines that one of the target body 100 and the neighboring body 200 has passed the other when the front and rear relationship between the target body 100 and the neighboring body 200 is reversed. The weighting part 224 then determines that the change matches the weighting condition for the adjacent lane when the front and rear relationship between the target body 100 and the neighboring body 200 is reversed.

Note that the weighting part 224 may also add, to the condition for determining that one has passed the other, a gradual decrease followed by a gradual increase in the relative position between the target body 100 and the neighboring body 200 in addition to the reversal of the front and rear relationship between the target body 100 and the neighboring body 200.

The weighting part 224 advances the processing to step S306 to weight the probability of presence 43 if the change matches the weighting condition, or advances the processing to step S307 if the change does not match the weighting condition.

In adjacent lane weighting processing of step S306, the weighting part 224 increases the probability of presence 43 in the relative area 40 corresponding to a lane adjacent to the lane where the target body 100 travels among the plurality of relative areas 40, because the two vehicles are highly likely to be traveling in adjacent lanes when one passes the other.

Specifically, the weighting part 224 increases the probability of presence 43 in the area AL and the area BL when one of the neighboring body 200 and the target body 100 passes the other on the left. At this time, the weighting part 224 may lower the probability of presence 43 in each of the area A and the area B corresponding to the same lane. On the other hand, the weighting part 224 increases the probability of presence 43 in the area AR and the area BR when one of the neighboring body 200 and the target body 100 passes the other on the right. At this time, the weighting part 224 may lower the probability of presence 43 in each of the area A and the area B corresponding to the same lane.

One passes the other on the left when the relative area 40 with the highest probability of presence 43 changes either from the area AL or the area MAL to the area BL or the area MBL, or from the area BL or the area MBL to the area AL or the area MAL. One passes the other on the right when the relative area 40 with the highest probability of presence 43 changes either from the area AR or the area MAR to the area BR or the area MBR, or from the area BR or the area MBR to the area AR or the area MAR.

In front-rear determination processing of step S307, the weighting part 224 determines whether or not the change in the relative position identified in step S302 matches a weighting condition for the front and rear.

A specific description will be given with reference to FIG. 18. There is a case where a vehicle catches up with another vehicle. In such a case, the relative speed decreases as the relative position between the two vehicles decreases as illustrated in FIG. 18. Moreover, the two vehicles in the above case travel in the same lane.

Accordingly, the weighting part 224 determines that one of the target body 100 and the neighboring body 200 has caught up with the other when the relative speed decreases as the relative position becomes closer to each other. The weighting part 224 then determines that the change matches the weighting condition for the front and rear when the relative speed decreases as the relative position becomes closer to each other.

The weighting part 224 advances the processing to step S308 to weight the probability of presence 43 if the change matches the weighting condition, or advances the processing to step S309 if the change does not match the weighting condition.

In front-rear weighting processing of step S308, the weighting part 224 increases the probability of presence 43 in the relative area 40 corresponding to the same lane as the lane where the target body 100 travels among the plurality of relative areas 40, because the two vehicles are highly likely to be traveling in the same lane when one catches up with the other.

Specifically, the weighting part 224 increases the probability of presence 43 in the area A when the neighboring body 200 is in front of the target body 100. At this time, the weighting part 224 may lower the probability of presence 43 in the area B in the rear. Moreover, at this time, the weighting part 224 may lower the probability of presence 43 in each of the area AL and the area AR adjacent to the area A. The weighting part 224 increases the probability of presence 43 in the area B when the neighboring body 200 is behind the target body 100. At this time, the weighting part 224 may lower the probability of presence 43 in the area A in front. Moreover, at this time, the weighting part 224 may lower the probability of presence 43 in each of the area BL and the area BR adjacent to the area B.

The neighboring body 200 is in front of the target body 100 when the relative area 40 having the highest probability of presence 43 is any one of the area A, the area AL, the area AR, the area MAL, and the area MAR. The neighboring body 200 is behind the target body 100 when the relative area 40 having the highest probability of presence 43 is any one of the area B, the area BL, the area BR, the area MBL, and the area MBR.

In sides determination processing of step S309, the weighting part 224 determines whether or not the change in the relative position identified in step S302 matches a weighting condition for the sides.

A specific description will be given with reference to FIG. 19. There is a case where a vehicle crosses an intersection. When a vehicle crosses an intersection as illustrated in FIG. 19, the relative position between the vehicles shifts from one of left and right sides to the other side. After crossing the intersection, the vehicle is at the position after crossing and does not return to the position before crossing. However, the probability of presence 43 may be set at the position before crossing.

The weighting part 224 thus determines that the neighboring body 200 has crossed the intersection when the neighboring body 200 crosses from one of left and right sides to the other side of the target body 100. The weighting part 224 then determines that the change matches the weighting condition for the sides when the neighboring body 200 crosses from one of left and right sides to the other side of the target body 100.

The weighting part 224 advances the processing to step S310 to weight the probability of presence 43 if the change matches the weighting condition, or ends the processing if the change does not match the weighting condition.

In sides weighting processing of step S310, the weighting part 224 increases the probability of presence 43 in the relative area 40 corresponding to the other side of the target body 100 and decreases the probability of presence 43 in the relative area 40 corresponding to the one side of the object among the plurality of relative areas 40, because the neighboring body upon crossing the intersection from the one side to the other side of the target body 100 is highly likely to be at the position after crossing and less likely to be at the position before crossing.

Specifically, the weighting part 224 increases the probability of presence 43 in the area IL and decreases the probability of presence 43 in the area IR when the neighboring body 200 crosses the intersection from the right side to the left side of the target body 100. The weighting part 224 increases the probability of presence 43 in the area IR and decreases the probability of presence 43 in the area IL when the neighboring body 200 crosses the intersection from the left side to the right side of the target body 100.

A specific example of weighting will be described with reference to FIG. 20.

In the same lane weighting processing of step S304, the weighting part 224 multiplies the probability of presence 43 in the area A by 1.3 when the neighboring body 200 is in front of the target body 100, as indicated in (1). The weighting part 224 also multiplies the probability of presence 43 in the area B in the rear by 0.7, and multiplies the probability of presence 43 in each of the area BL and the area BR by 0.8.

Similarly, as indicated in (2), the weighting part 224 multiplies the probability of presence 43 in the area B by 1.3 when the neighboring body 200 is behind the target body 100. The weighting part 224 also multiplies the probability of presence 43 in the area A in front by 0.7, and multiplies the probability of presence 43 in each of the area AL and the area AR by 0.8.

In the adjacent lane weighting processing of step S306, as indicated in (3), the weighting part 224 multiplies the probability of presence 43 in each of the area AL and the area BL by 1.1 when one of the neighboring body 200 and the target body 100 passes the other on the left. The weighting part 224 also multiplies the probability of presence 43 in each of the area A and the area B corresponding to the same lane by 0.7.

Similarly, as indicated in (4), the weighting part 224 multiplies the probability of presence 43 in each of the area AR and the area BR by 1.1 when one of the neighboring body 200 and the target body 100 passes the other on the right. The weighting part 224 also multiplies the probability of presence 43 in each of the area A and the area B corresponding to the same lane by 0.7.

Note that the weighting part 224 may decrease the probability of presence 43 in the relative area 40 in the rear when the neighboring body 200 passes the target body 100 completely.

Thus, as indicated in (3), the weighting part 224 multiplies the probability of presence 43 in the area AL by 1.3 and multiplies the probability of presence 43 in the area BL by 0.9 when the neighboring body 200 completely passes the target body 100 on the left. The weighting part 224 also multiplies the probability of presence 43 in each of the area A and the area B corresponding to the same lane by 0.3.

Similarly, as indicated in (4), the weighting part 224 multiplies the probability of presence 43 in the area AR by 1.3 and multiplies the probability of presence 43 in the area BR by 0.9 when the neighboring body 200 completely passes the target body 100 on the right. The weighting part 224 also multiplies the probability of presence 43 in each of the area A and the area B corresponding to the same lane by 0.3.

Weighting can be performed on the basis of a similar idea for the case where the target body 100 completely passes the neighboring body 200.

In the front-rear weighting processing of step S308, the weighting part 224 multiplies the probability of presence 43 in the area A by "$\alpha$" when the neighboring body 200 is in front of the target body 100. The weighting part 224 also multiplies the probability of presence 43 in the area B in the rear by "$\beta$". Similarly, the weighting part 224 multiplies the probability of presence 43 in the area B by "$\alpha$" when the neighboring body 200 is behind the target body 100. The weighting part 224 also multiplies the probability of presence 43 in the area A in front by "$\beta$".

A higher value of "$\alpha$" set to 1.0 to 1.3 is used as the relative speed decreases. A lower value of "$\beta$" set to 0.7 to 1.0 is used as the relative speed decreases. Note that the values of "$\alpha$" and "$\beta$" may be determined in consideration of whether or not the relative position is close.

In the sides weighting processing of step S310, the weighting part 224 multiplies the probability of presence 43 in the area IL by "$\alpha$" and multiplies the probability of presence 43 in the area IR by "$\beta$" when the neighboring body 200 crosses the intersection from the right side to the left side of the target body 100. Similarly, the weighting part 224 multiplies the probability of presence 43 in the area IR by "$\alpha$" and multiplies the probability of presence 43 in the area IL by "$\beta$" when the neighboring body 200 crosses the intersection from the left side to the right side of the target body 100.

A higher value of "$\alpha$" set to 1.0 to 1.5 is used as the neighboring body 200 crosses farther into the intersection. A lower value of "$\beta$" set to 0.3 to 0.7 is used as the neighboring body 200 crosses farther into the intersection.

The weighting value illustrated in FIG. 20 is an example and may be another value. The weighting value may also be changed in accordance with a degree of match for each condition.

Effects of Second Embodiment

As described above, the position estimation apparatus 10 according to the second embodiment weights the probability of presence 43 from the past history of the change in the relative position. As a result, the relative positional relationship between the target body 100 and the neighboring body 200 can be estimated more accurately than in the first embodiment.

\*\*\*Another Configuration\*\*\*

<Fifth Variation>

The processings from step S201 to step S210 of FIG. 14 are executed synchronously. As a fifth variation, the processings from step S201 to step S203, the processings from step S204 to step S205, and the processings from step S206 to step S210 may be executed asynchronously as with the first variation.

Third Embodiment

A third embodiment is different from the first and second embodiments in that a probability of presence 43 is weighted on the basis of a relative vector between a target body 100 and a neighboring body 200. This difference will be described in the third embodiment.

Note that although the third embodiment will describe the difference from the second embodiment, the following functions can be added to the first embodiment as well.

\*\*\*Description of Configuration\*\*\*

The configuration of a position estimation apparatus 10 according to the third embodiment will be described with reference to FIG. 21.

Figure 12:
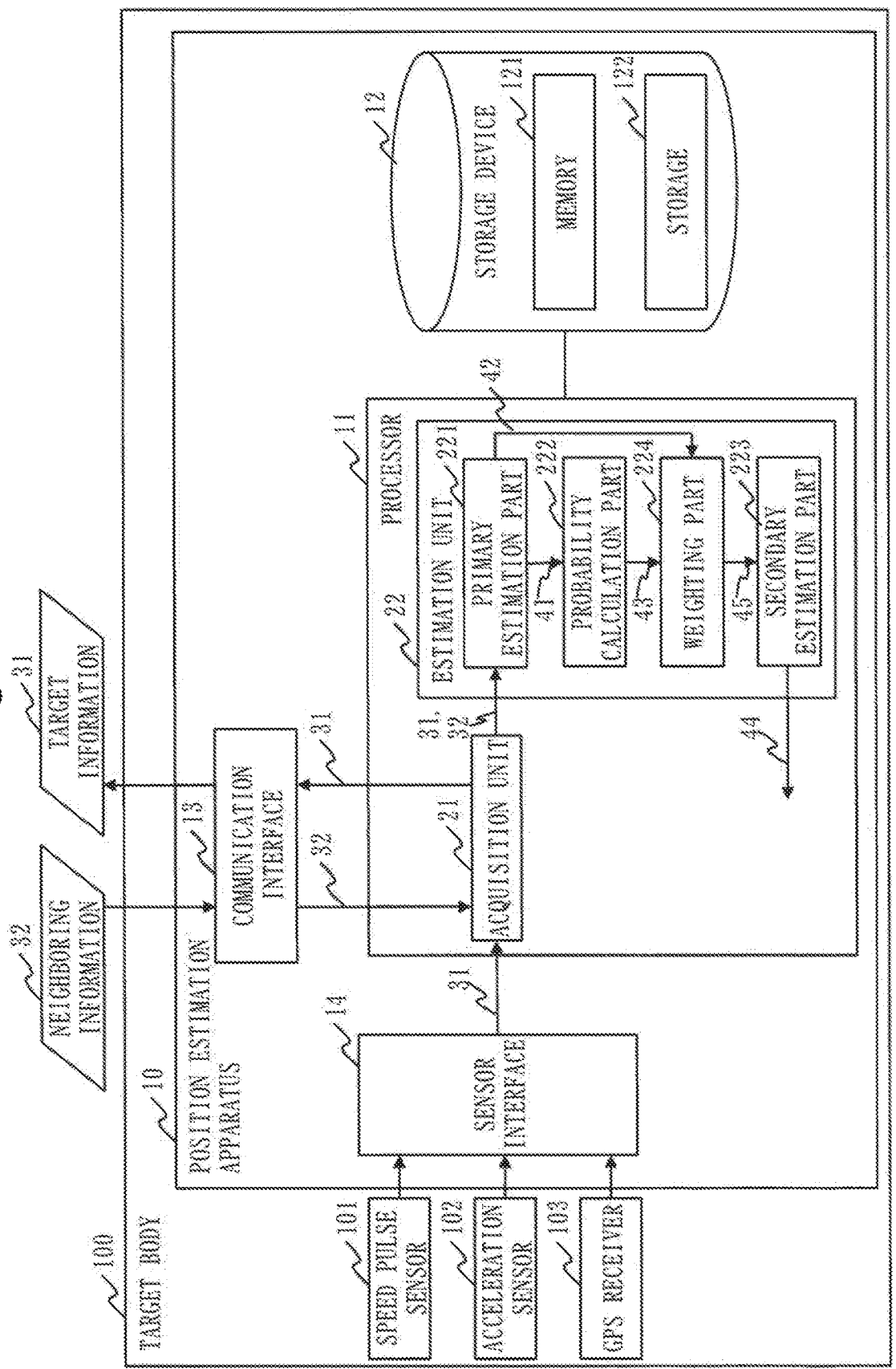
FIG. 12 is a block diagram of a position estimation apparatus 10 according to a second embodiment.
Figure 13:
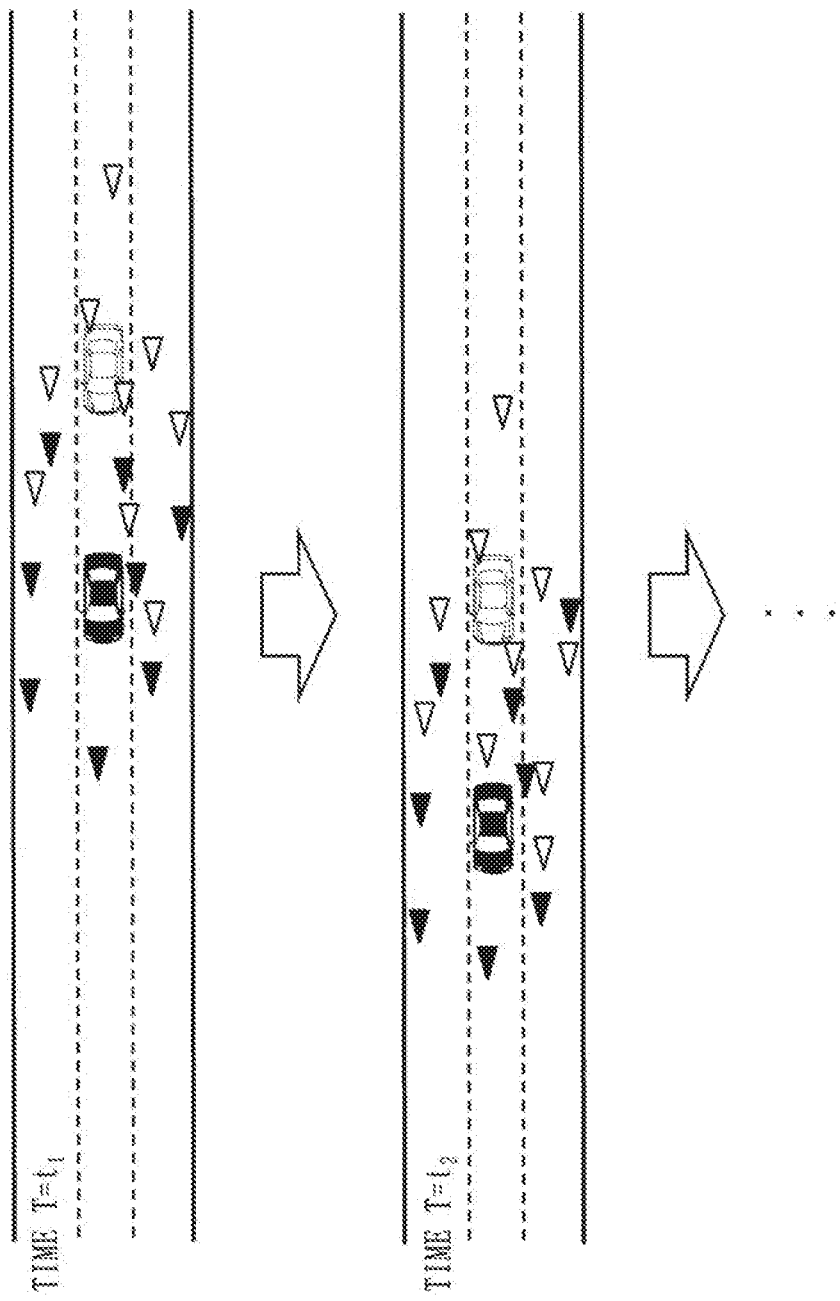
FIG. 13 is an illustrative diagram of the overview of the operation of the position estimation apparatus 10 according to the second embodiment.

The position estimation apparatus 10 is different from the position estimation apparatus 10 of the second embodiment illustrated in FIG. 12 in that a primary estimation part 221 calculates a relative vector 46 and that a weighting part 224 performs weighting by using the relative vector 46 calculated by the primary estimation part 221.

\*\*\*Description of Operation\*\*\*

The operation of the position estimation apparatus 10 according to the third embodiment will be described with reference to FIGS. 21 to 23.

The operation of the position estimation apparatus 10 according to the third embodiment corresponds to a position estimation method according to the third embodiment. The operation of the position estimation apparatus 10 according to the third embodiment also corresponds to processing of a position estimation program according to the third embodiment.

The overview of the operation of the position estimation apparatus 10 according to the third embodiment will be described with reference to FIGS. 21 and 22.

The primary estimation part 221 calculates a velocity vector of the target body 100 and a velocity vector of the neighboring body 200 from target information 31 and neighboring information 32 within a past reference period. The primary estimation part 221 then calculates the relative vector 46 by subtracting the velocity vector of the neighboring body 200 from the velocity vector of the target body 100. The weighting part 224 increases the probability of presence 43 in a relative area 40 located in a direction indicated by the relative vector 46 calculated by the primary estimation part 221.

Figure 22:
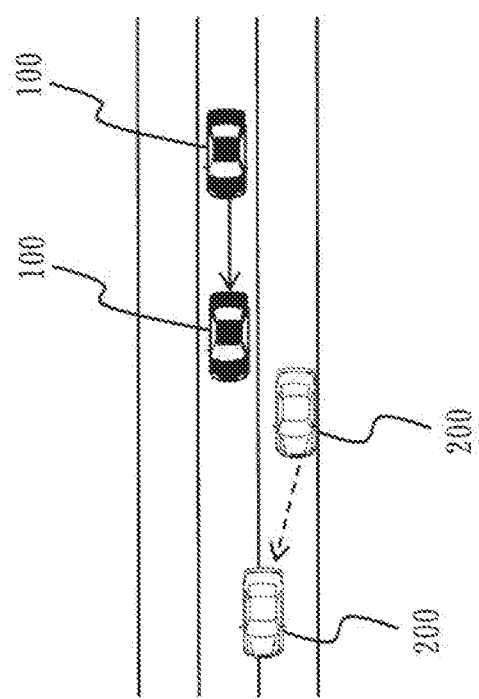
FIG. 22 is an illustrative diagram of the overview of the operation of the position estimation apparatus 10 according to the third embodiment.

In FIG. 22, a solid arrow represents the velocity vector of the target body 100, and a dotted arrow represents the velocity vector of the neighboring body 200. In FIG. 22, the velocity vector of the neighboring body 200 is directed slightly to the right with respect to the direction of travel compared to the velocity vector of the target body 100. Thus, the direction indicated by the relative vector 46 points slightly to the right with respect to the direction of travel. Accordingly, the weighting part 224 increases the probability of presence 43 in a relative area 40 on the right of a relative area 40 determined as the secondary area 44 the last time.

The details of the operation of the position estimation apparatus 10 according to the third embodiment will be described with reference to FIGS. 21 and 23.

Figure 23:
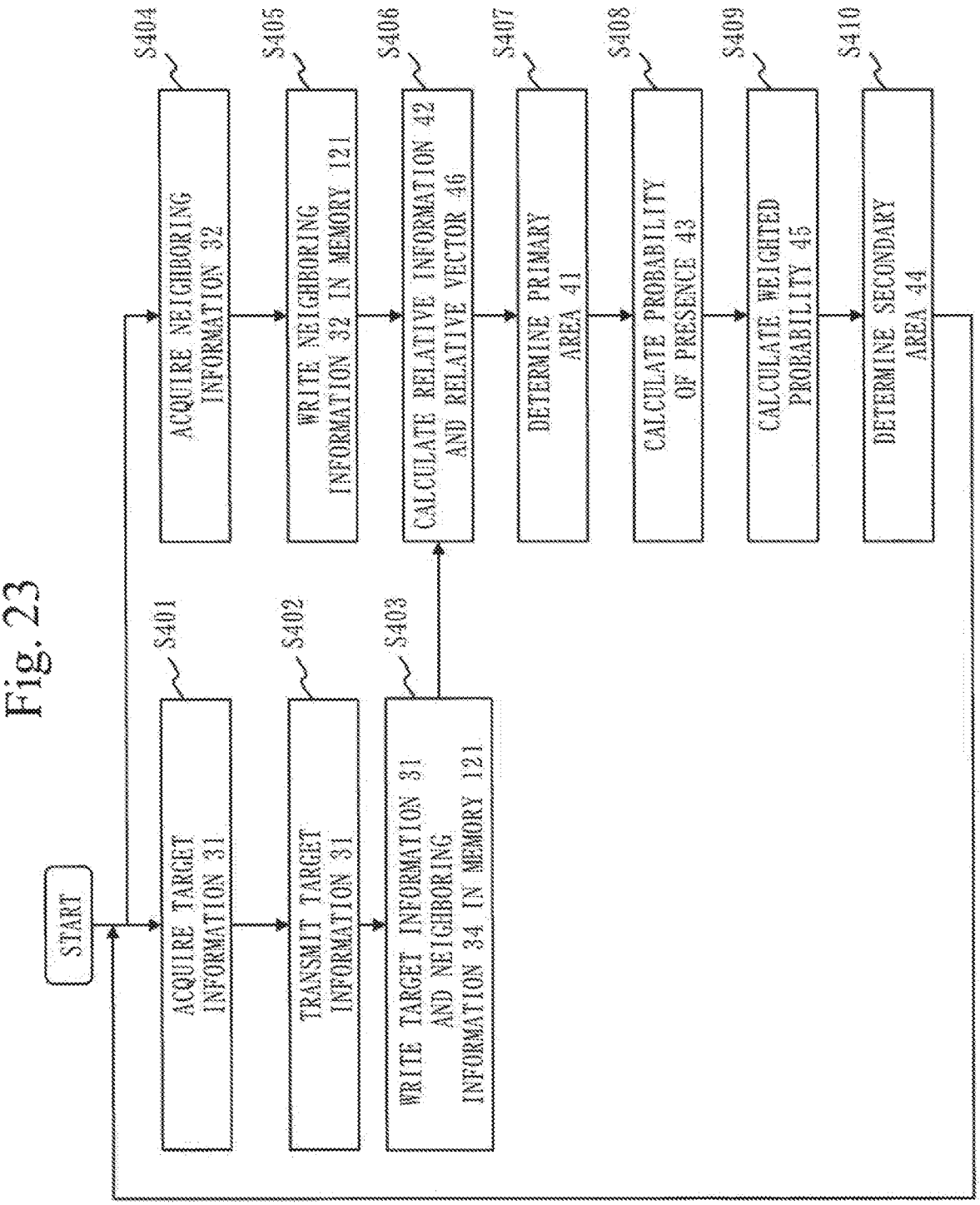
FIG. 23 is a flowchart illustrating the operation of the position estimation apparatus 10 according to the third embodiment.

The processings illustrated in FIG. 23 are executed repeatedly at regular intervals until the processings are no longer required. Note that, as with the processings illustrated in FIG. 14, the processings illustrated in FIG. 23 may be executed on an event-driven basis instead of being repeated at regular intervals.

The processings from step S401 to step S40S are the same as the processings from step S201 to step S205 in FIG. 14. Moreover, the processings from step S407 to step S408 are the same as the processings from step S207 to step S208 in FIG. 14. Furthermore, the processing of step S410 is the same as the processing of step S210 in FIG. 14.

In relative information calculation processing of step S406, the primary estimation part 221 reads, from a memory 121, the target information 31 written in step S103 and the neighboring information 32 written in step S105 in the past reference period.

As with the second embodiment, the primary estimation part 221 calculates relative information 42 which can identify the relative position between the target body 100 and the neighboring body 200 from the target information 31 and the neighboring information 32 being read.

The primary estimation part 221 also calculates the velocity vector of the target body 100 from the target information 31 within the past reference period. The velocity vector is information including the velocity and the direction. The velocity vector of the target body 100 is calculated from the position and the time indicated by the target information 31 within the past reference period. Similarly, the primary estimation part 221 calculates the velocity vector of the neighboring body 200 from the neighboring information 32 within the past reference period. The primary estimation part 221 then calculates a difference between the velocity vector of the target body 100 and the velocity vector of the neighboring body 200 as the relative vector 46. The primary estimation part 221 writes the relative vector 46 being calculated in the memory 121.

Note that when the target information 31 and the neighboring information 32 include information such as a steering angle, lateral acceleration, longitudinal acceleration, and vertical acceleration, the primary estimation part 221 may use these pieces of information to correct the relative vector 46 being calculated. As a specific example, the direction indicated by the relative vector 46 is straight ahead when the target body 100 and the neighboring body 200 travel straight ahead. However, when the neighboring body 200 steers to the right at the latest timing, the neighboring body 200 is to move to the right thereafter. Thus, when the latest steering angle of the neighboring body 200 is turned to the right with respect to the past steering angle, the relative vector 46 is corrected to the right in accordance with the angle turned.

In weighting processing of step S409, as with the second embodiment, the weighting part 224 weights the probability of presence 43 on the basis of a change in the relative position or the like.

The weighting part 224 also reads the relative vector 46 calculated in step S406 from the memory 121. The weighting part 224 then calculates a weighted probability 45 such that the probability of presence 43 is high in the relative area 40 located in the direction indicated by the relative vector 46 while the probability of presence 43 is low in the relative area 40 located in a direction different from the direction indicated by the relative vector 46 from the relative area 40 determined as the secondary area 44 the last time. The weighting part 224 may increase the probability of presence 43 as a degree of coincidence with the direction indicated by the relative vector 46 is higher and decrease the probability of presence 43 as the degree of coincidence is lower.

The weighting part 224 writes the weighted probability 45 being calculated in the memory 121.

Effects of Third Embodiment

As described above, the position estimation apparatus 10 according to the third embodiment weights the probability of presence 43 from the velocity vectors of the target body 100 and the neighboring body 200. As a result, the relative positional relationship between the target body 100 and the neighboring body 200 can be estimated more accurately than in the second embodiment.

*Other Configurations*

<Sixth Variation>

The third embodiment performs weighting to increase the probability of presence 43 in the relative area 40 located in the direction indicated by the relative vector 46. As a sixth variation, the relative vector 46 may be used as information representing the correlation of motion among a plurality of neighboring bodies 200, and the probability of presence 43 may be weighted on the basis of a degree of the correlation of motion among the neighboring bodies 200.

Specifically, in a case where there are two neighboring bodies 200, a neighboring body 200A and a neighboring body 200B, the neighboring body 200A and the neighboring body 200B are possibly traveling while one is following the other if a relative vector 46 between the target body 100 and the neighboring body 200A is close to a relative vector 46 between the target body 100 and the neighboring body 200B. The probability of presence 43 may thus be weighted assuming that the neighboring body 200A and the neighboring body 200B are traveling in the same lane.

<Seventh Variation>

The processings from step S401 to step S410 of FIG. 23 are executed synchronously. As a seventh variation, the processings from step S401 to step S403, the processings from step S404 to step S405, and the processings from step S406 to step S410 may be executed asynchronously as with the fifth variation.

Fourth Embodiment

A fourth embodiment is different from the first to third embodiments in that a probability of presence 43 is weighted in consideration of map information. This difference will be described in the fourth embodiment.

Note that although the fourth embodiment will describe the difference from the third embodiment, the following functions can be added to the first and second embodiments as well.

*Description of Configuration*

The configuration of a position estimation apparatus 10 according to the fourth embodiment will be described with reference to FIG. 24.

Figure 21:
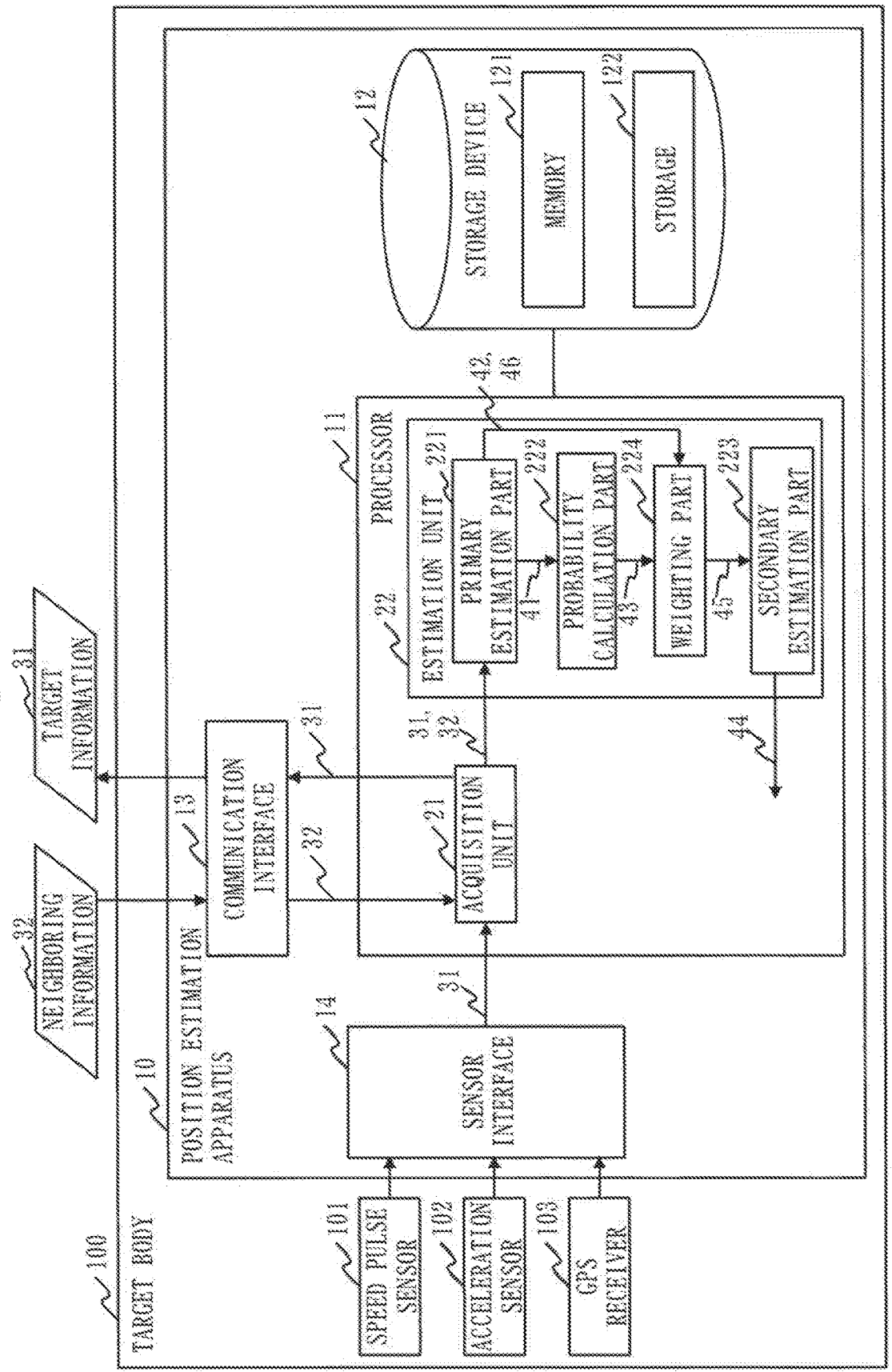
FIG. 21 is a block diagram of a position estimation apparatus 10 according to a third embodiment.

The position estimation apparatus 10 is different from the position estimation apparatus 10 according to the third embodiment illustrated in FIG. 21 in that map information 33 is stored in a storage 122 and used by a weighting part 224.

The map information 33 is formed of a hierarchy of maps corresponding to a plurality of scales, and includes road information, lane information, and component line information. The road information indicates for each road a shape, latitude, longitude, a curvature, a gradient, an identifier, the number of lanes, a line type, and an attribute of the road. The attribute indicates the road type such as a general road, a freeway, or a through street. The lane information is information on a lane constituting the road and indicates an identifier, latitude, longitude, and a center line of the lane. The component line information is information on a component line constituting the lane and indicates an identifier, latitude, longitude, a line type, and a curvature of the line constituting the lane.

*Description of Operation*

The operation of the position estimation apparatus 10 according to the fourth embodiment will be described with reference to FIGS. 23 to 25.

The operation of the position estimation apparatus 10 according to the fourth embodiment corresponds to a position estimation method according to the fourth embodiment. The operation of the position estimation apparatus 10 according to the fourth embodiment also corresponds to processing of a position estimation program according to the fourth embodiment.

The overview of the operation of the position estimation apparatus 10 according to the fourth embodiment will be described with reference to FIGS. 24 and 25.

The weighting part 224 can identify a location where a neighboring body 200 is absent by referring to the map information 33. The weighting part 224 thus decreases the probability of presence 43 in a relative area 40 in which no presence of the neighboring body 200 is indicated by the map information 33. In FIG. 25, the probability of presence 43 is decreased in a relative area 40 on the left of a target body 100 where there is no lane.

The details of the operation of the position estimation apparatus 10 according to the fourth embodiment will be described with reference to FIGS. 24 and 23.

The processings other than step S409 are the same as those in the third embodiment.

In weighting processing of step S409, as with the second and third embodiments, the weighting part 224 weights the probability of presence 43 on the basis of a change in the relative position or the like and a relative vector 46.

The weighting part 224 also reads the map information 33 around the position of the target body 100 from the storage 122. Then, the weighting part 224 identifies a location with no possibility of presence of the neighboring body 200 from the map information 33, thereby calculating a weighted probability 45 to decrease the probability of presence 43 in a relative area 40 in which no presence of the neighboring body 200 is indicated by the map information 33. The weighting part 224 writes the weighted probability 45 being calculated in a memory 121.

Specifically, when the target body 100 travels on a road having one lane in each direction, there is no lane but the lane where the target body 100 travels. Therefore, in principle, relative areas 40 such as the area AL, the area AR, the area BL, and the area BR do not exist. The weighting part 224 thus decreases the probability of presence 43 in the relative areas 40 such as the area AL, the area AR, the area BL, and the area BR.

Moreover, relative areas 40 such as the area IL and the area IR do not exist except at an intersection. The weighting part 224 thus decreases the probability of presence 43 in the relative areas 40 such as the area IL and the area IR.

In identifying the neighboring body 200 traveling on the opposite lane as well, one can identify from the map information 33 whether the area observes right-hand traffic or left-hand traffic to be able to determine that there is no oncoming vehicle traveling on the right side when the area observes the right-hand traffic.

Effects of Fourth Embodiment

As described above, the position estimation apparatus 10 according to the fourth embodiment weights the probability of presence 43 in consideration of the map information 33. This can avoid estimating that the neighboring body 200 is present at a location with no possibility of presence of the neighboring body 200, whereby the relative positional relationship between the target body 100 and the neighboring body 200 can be estimated more accurately than in the third embodiment.

\*\*\*Other Configurations\*\*\*

<Eighth Variation>

The fourth embodiment uses the map information 33 for weighting. As an eighth variation, the map information 33 may be used to define the relative area 40. The eighth variation will be described focusing on a difference from the fourth embodiment.

Figure 26:
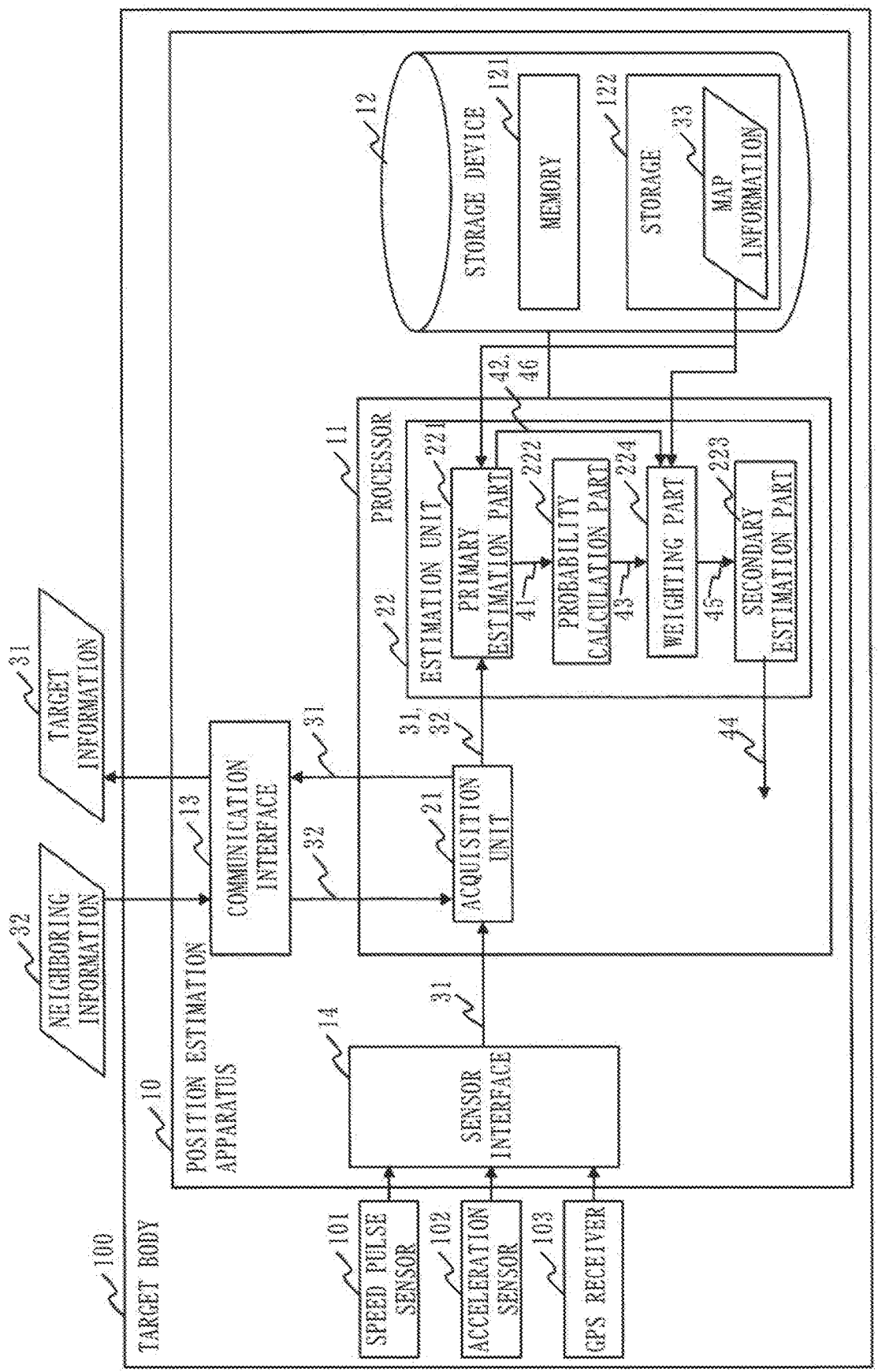
FIG. 26 is a block diagram of a position estimation apparatus 10 according to an eighth variation.

The configuration of the position estimation apparatus 10 according to the eighth variation will be described with reference to FIG. 26.

The position estimation apparatus 10 is different from the position estimation apparatus 10 according to the third embodiment illustrated in FIG. 21 in that the primary estimation part 221 uses the map information 33.

The operation of the position estimation apparatus 10 according to the eighth variation will be described with reference to FIGS. 23, 26, and 27.

The processings other than step S407 are the same as those in the fourth embodiment.

In primary area determination processing of step S407, the primary estimation part 221 define the plurality of relative areas 40 by dividing the area around the target body 100 on the basis of the road shape indicated by the map information 33.

Specifically, the primary estimation part 221 reads the map information 33 from the storage 122. The primary estimation part 221 then defines the relative areas 40 in consideration of the road shape around the position of the target body 100 indicated by the map information 33. That is, if the road curves, each relative area 40 is defined in a curved manner along the curve, as illustrated in FIG. 27.

Figure 27:
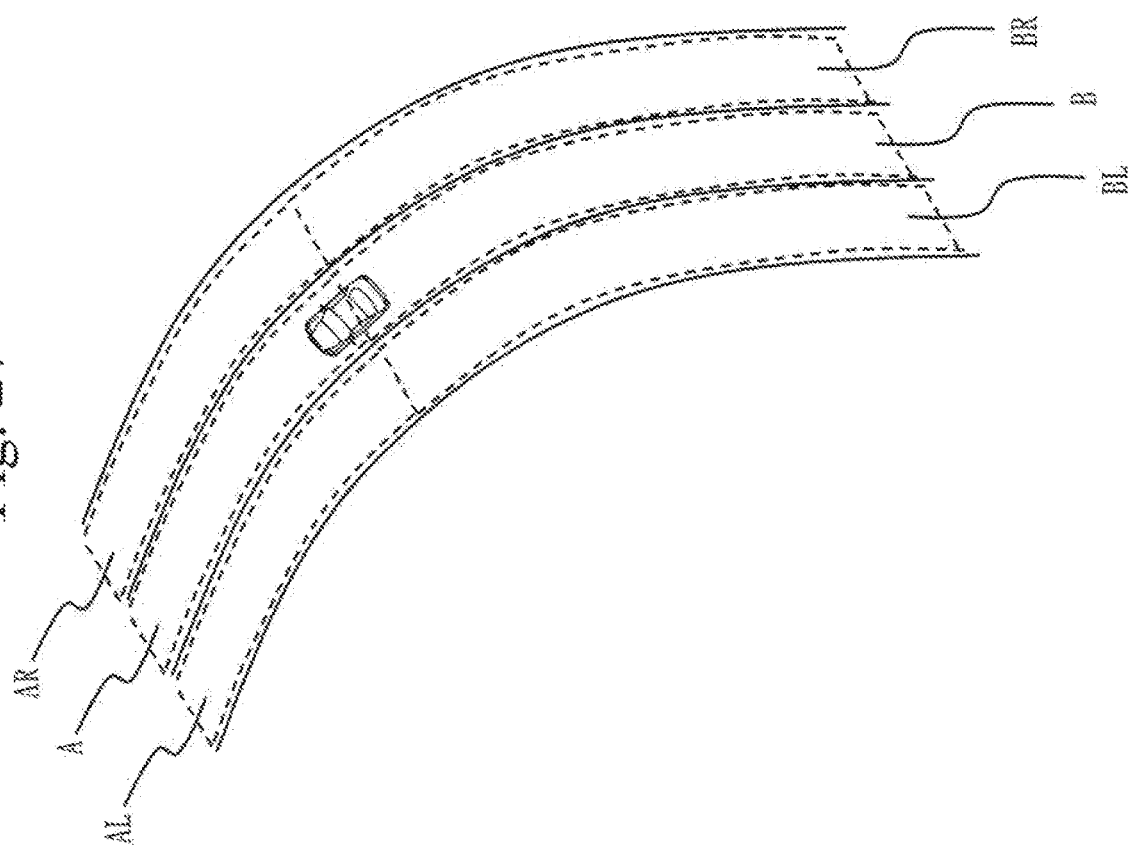
FIG. 27 is an illustrative diagram of the overview of the operation of the position estimation apparatus 10 according to the eighth variation.

The relative area 40 is thus defined in accordance with the road shape as illustrated in FIG. 27, rather than simply defining the relative area 40 in front of or behind the target body 100 with respect to the direction of travel thereof. As a result, the risk of collision can be determined appropriately.

Note that when the steering angle is included in the target information 31 and the neighboring information 32, the plurality of relative areas 40 may be defined by using a change in the steering angle together with the map information 33. Specifically, one can estimate that the road curves when the steering wheel is turned, whereby the degree of curve of the road can be estimated by the steering angle.

<Ninth Variation>

The eighth variation defines the relative area 40 by using the map information 33. As a ninth variation, the relative area 40 may be defined in consideration of whether an object makes a right turn or a left turn when turning right in the left-hand traffic or turning left in the right-hand traffic. The ninth variation will be described focusing on a difference from the eighth variation.

The ninth variation will describe the case of turning right in the left-hand traffic as an example. However, a similar way of thinking applies to the case of turning left in the right-hand traffic.

The operation of the position estimation apparatus 10 according to the ninth variation will be described with reference to FIGS. 23, 26, and 28.

The processings other than step S407 are the same as those in the eighth variation.

In primary area determination processing of step S407, as with the eighth variation, the primary estimation part 221 define the plurality of the relative areas 40 by dividing the area around the target body 100 on the basis of the road shape indicated by the map information 33. At this time, however, the relative area 40 is defined in consideration of whether or not the target body 100 is turning right.

Specifically, the primary estimation part 221 defines the relative area 40 in a manner similar to that of the eighth variation when the target body 100 is not turning right. When the target body 100 is turning right, on the other hand, the primary estimation part 221 maintains the definition of the relative area 40 before the right turn is started until the target body 100 passes an intersection and completes the right turn.

The primary estimation part 221 identifies whether or not the target body 100 is turning right on the basis of the road shape indicated by the map information 33. Specifically, the primary estimation part 221 can identify that the target body 100 is turning right when the target body 100 enters the intersection from a right-turn lane. Alternatively, when the steering angle is included in the target information 31, the primary estimation part 221 may identify that the target body 100 is turning right in consideration of a change in the steering angle to the right together with the map information 33. The primary estimation part 221 may also identify that the target body 100 is turning right in consideration of deceleration of the target body 100 at the intersection and/or a turn signal being operated.

The primary estimation part 221 may also identify that the target body 100 has completed the right turn in consideration of the steering angle being returned to the straight ahead direction together with the map information 33. The primary estimation part 221 may also identify that the target body 100 has completed the right turn in consideration of the operation of the turn signal being stopped.

Figure 28:
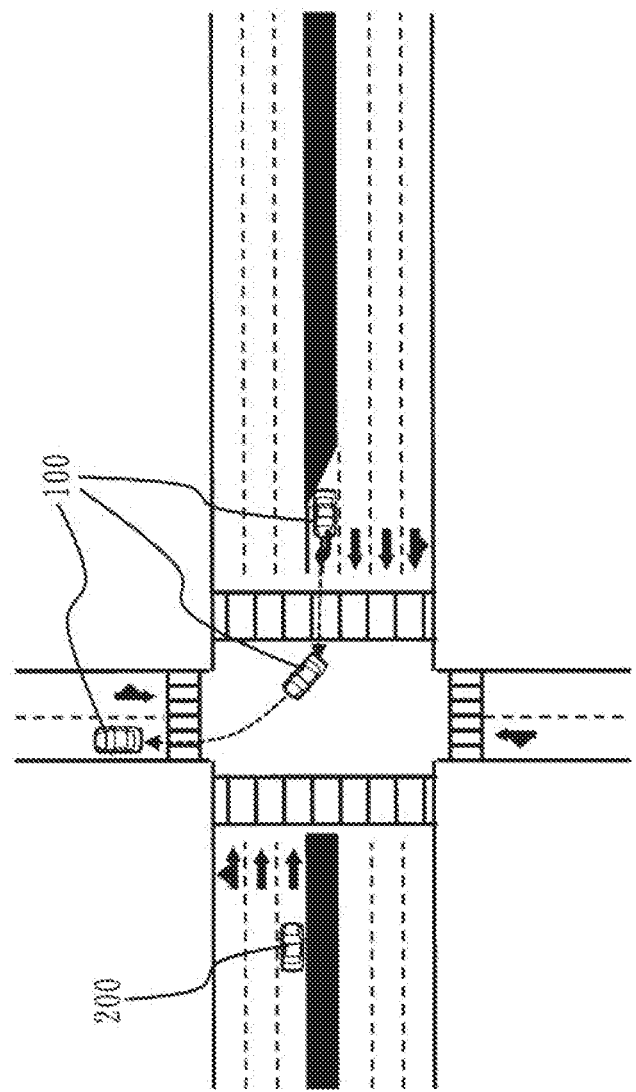
FIG. 28 is an illustrative diagram of the overview of the operation of a position estimation apparatus 10 according to a ninth variation.

As illustrated in FIG. 28, the direction of the target body 100 gradually changes when the target body 100 turns right. Therefore, the relative area 40 may not be defined appropriately when the relative area 40 is to be defined simply in accordance with the direction of travel of the target body 100. Specifically, in FIG. 28, the neighboring body 200 traveling on the opposite lane is possibly determined to be a neighboring body 200 present outside the range or a neighboring body 200 in the area IL.

When the target body 100 is turning right, however, the relative area 40 can be defined appropriately by maintaining the definition of the relative area 40 before the right turn is started until the right turn is completed. As a result, the risk of collision can be determined appropriately.

Note that in the ninth variation, the relative area 40 is defined in consideration of whether the object makes a right turn or a left turn when turning right in the left-hand traffic or turning left in the right-hand traffic. However, when the direction of travel of the target body 100 temporarily changes to the left or right at the time of a lane change as well, the definition of the relative area 40 before the lane change is started may be maintained until the lane change is completed.

Fifth Embodiment

A fifth embodiment is different from the first to fourth embodiments in terms of acquiring neighboring information 34 by a detector 104 such as a camera, a millimeter wave radar, and a laser radar in addition to neighboring information 32 from a neighboring body 200, and weighting a probability of presence 43 in consideration of the neighboring information 34 acquired by the detector 104.

Note that although the fifth embodiment will describe the difference from the fourth embodiment, the following functions can be added to the first to third embodiments as well.

*Description of Configuration*

The configuration of a position estimation apparatus 10 according to the fifth embodiment will be described with reference to FIG. 29.

Figure 24:
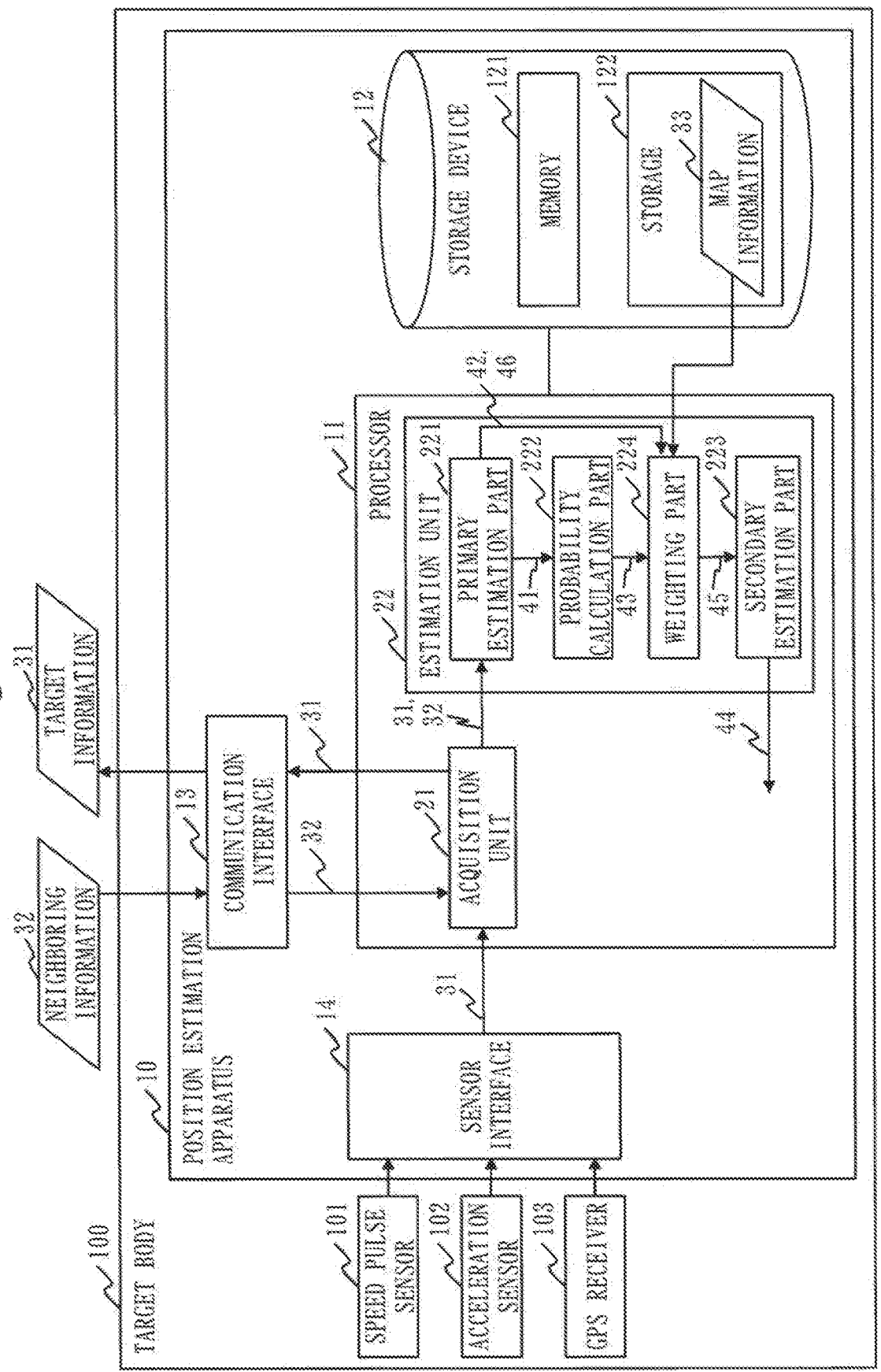
FIG. 24 is a block diagram of a position estimation apparatus 10 according to a fourth embodiment.
Figure 25:
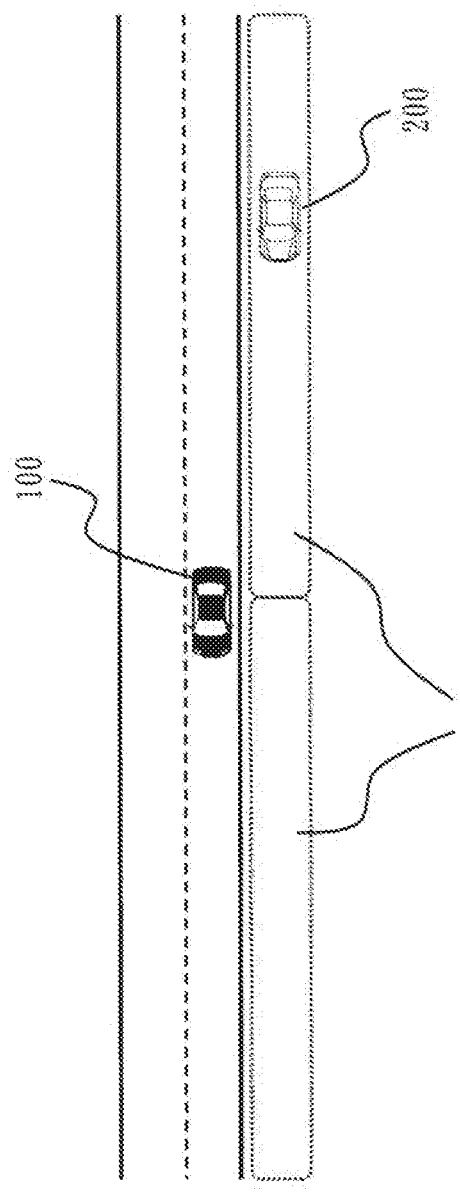
FIG. 25 is an illustrative diagram of the overview of the operation of the position estimation apparatus 10 according to the fourth embodiment.

The position estimation apparatus 10 is different from the position estimation apparatus 10 of the fourth embodiment illustrated in FIG. 24 in that an acquisition unit 21 acquires the neighboring information 34 from the detector 104 connected via a sensor interface 14 and that a weighting part 224 weights the probability of presence 43 in consideration of the neighboring information 34.

*Description of Operation*

The operation of the position estimation apparatus 10 according to the fifth embodiment will be described with reference to FIGS. 23, 29, and 30.

The operation of the position estimation apparatus 10 according to the fifth embodiment corresponds to a position estimation method according to the fifth embodiment. The operation of the position estimation apparatus 10 according to the fifth embodiment also corresponds to processing of a position estimation program according to the fifth embodiment.

The overview of the operation of the position estimation apparatus 10 according to the fifth embodiment will be described with reference to FIGS. 29 and 30.

The acquisition unit 21 repeatedly acquires the neighboring information 32 and 34 at regular intervals. As a degree of correlation between the neighboring information 32 acquired from the neighboring body 200 and the neighboring information 34 acquired by the detector 104 is higher, the weighting part 224 increases the probability of presence 43 in a relative area 40 that is determined to be a primary area 41.

The details of the operation of the position estimation apparatus 10 according to the fifth embodiment will be described with reference to FIGS. 29 and 23.

The processings other than step S401, step S403, and step S409 are the same as those in the fourth embodiment.

In object information acquisition processing of step S401, as with the fourth embodiment, the acquisition unit 21 acquires target information 31 regarding the position of a target body 100 while the target body 100 is on the move.

The acquisition unit 21 also acquires the neighboring information 34 from the detector 104 connected via the sensor interface 14 while the target body 100 is on the move.

Specifically, the acquisition unit 21 in the fifth embodiment uses the camera, the millimeter wave radar, and the laser radar to receive the neighboring information 34 via the sensor interface 14, the neighboring information including information that indicates the distance and angle with respect to an object including the neighboring body 200, the speed of the object, the type of the object, the shape of the object, and the like. The type of the object includes a four-wheeled vehicle, a two-wheeled vehicle, a pedestrian, a white line, a signal, and other obstacles.

The detector 104 may be disposed to detect the entire circumference of the target body 100 or detect a limited direction such as only the front of the target body 100.

In object information storage processing of step S403, the acquisition unit 21 writes the target information 31 into a memory 121 as well as the neighboring information 34 together with the time of acquisition thereof into the memory 121.

In weighting processing of step S409, the weighting part 224 calculates a degree of correlation between the neighboring information 32 acquired in step S404 and the neighboring information 34 acquired in step S401. The weighting part 224 then calculates a weighted probability 45 such that the probability of presence 43 in the relative area 40 determined to be the primary area 41 in step S407 is higher as the degree of correlation is higher.

Specifically, the weighting part 224 reads the neighboring information 32 acquired in step S404 and the neighboring information 34 acquired in step S401 from the memory 121. The weighting part 224 then calculates a degree of correlation for each item between the neighboring information 32 and the neighboring information 34, and adds up the degree of correlation for each item to determine the added value as the degree of correlation between the neighboring information 32 and the neighboring information 34. That is, the weighting part 224 calculates the degree of correlation for each item such as the position and the speed, which are included in both the neighboring information 32 and the neighboring information 34, and adds up the degrees of correlation being calculated. The weighting part 224 calculates the weighted probability 45 such that the probability of presence 43 in the relative area 40 determined to be the primary area 41 in step S407 is higher as the calculated degree of correlation between the neighboring information 32 and the neighboring information 34 is higher.

Effects of Fifth Embodiment

As described above, the position estimation apparatus 10 according to the fifth embodiment weights the probability of presence 43 in consideration of the neighboring information 34 acquired by the detector 104. The neighboring information 34 acquired by the detector 104 is more accurate than the neighboring information 32 in many cases. As a result, the relative positional relationship between the target body 100 and the neighboring body 200 can be estimated more accurately than in the fourth embodiment.

Sixth Embodiment

A sixth embodiment is different from the fifth embodiment in that driving assistance is performed by using a secondary area 44 determined in the first to fifth embodiments.

Note that although the sixth embodiment will describe the difference from the fifth embodiment, the following functions can be added to the first to fourth embodiments as well.

*Description of Configuration*

The configuration of a position estimation apparatus 10 according to the sixth embodiment will be described with reference to FIG. 31.

Figure 29:
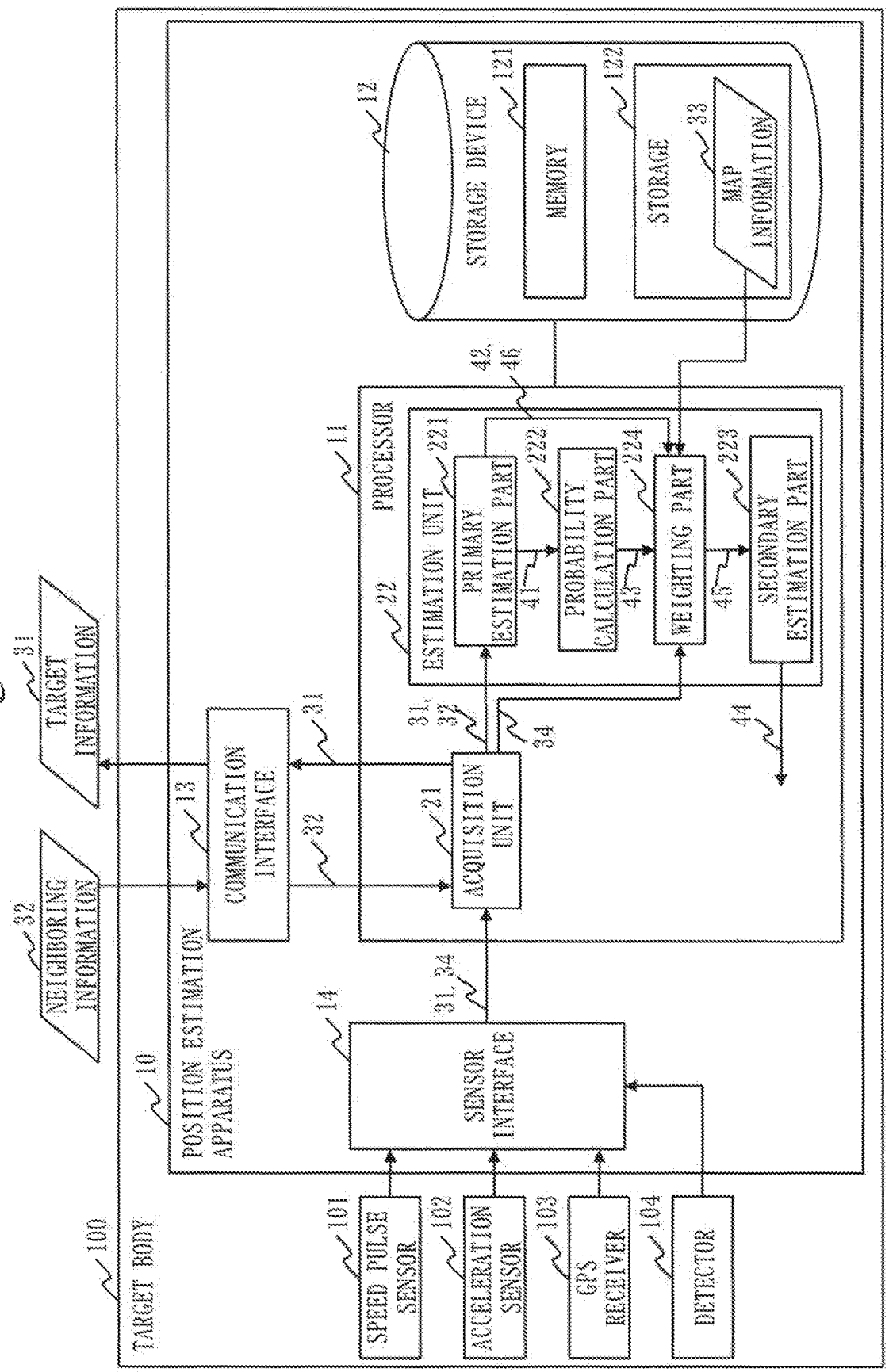
FIG. 29 is a block diagram of a position estimation apparatus 10 according to a fifth embodiment.
Figure 30:
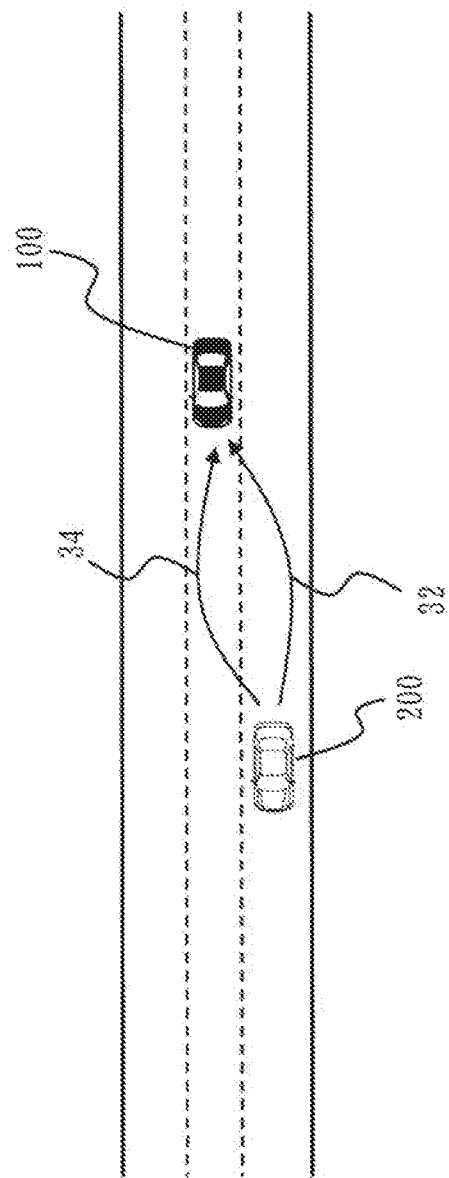
FIG. 30 is an illustrative diagram of the overview of the operation of the position estimation apparatus 10 according to the fifth embodiment.

The position estimation apparatus 10 includes a display interface 15 in addition to the configuration illustrated in FIG. 29. The display interface 15 is a device for connecting a display 105. The display interface 15 is specifically a video card, for example.

The position estimation apparatus 10 includes an assistance unit 23 in addition to the functional configuration illustrated in FIG. 29. The function of the assistance unit 23 is implemented in software.

A storage 122 stores a program for implementing the function of the assistance unit 23. The program is loaded into a processor 11 to be executed by the processor 11. The function of the assistance unit 23 is thus implemented.

\*\*\*Description of Operation\*\*\*

The operation of the position estimation apparatus 10 according to the sixth embodiment will be described with reference to FIGS. 31 to 33.

The operation of the position estimation apparatus 10 according to the sixth embodiment corresponds to a position estimation method according to the sixth embodiment. The operation of the position estimation apparatus 10 according to the sixth embodiment also corresponds to processing of a position estimation program according to the sixth embodiment.

The overview of the operation of the position estimation apparatus 10 according to the sixth embodiment will be described with reference to FIGS. 31 and 32.

A secondary estimation part 223 determines the secondary area 44. Then, on the basis of target information 31, neighboring information 32 and 34, and the secondary area 44, the assistance unit 23 determines whether or not driving assistance is necessary, and outputs and displays assistance information 47 on the display 105 connected via the display interface 15 when driving assistance is necessary.

Figure 32:
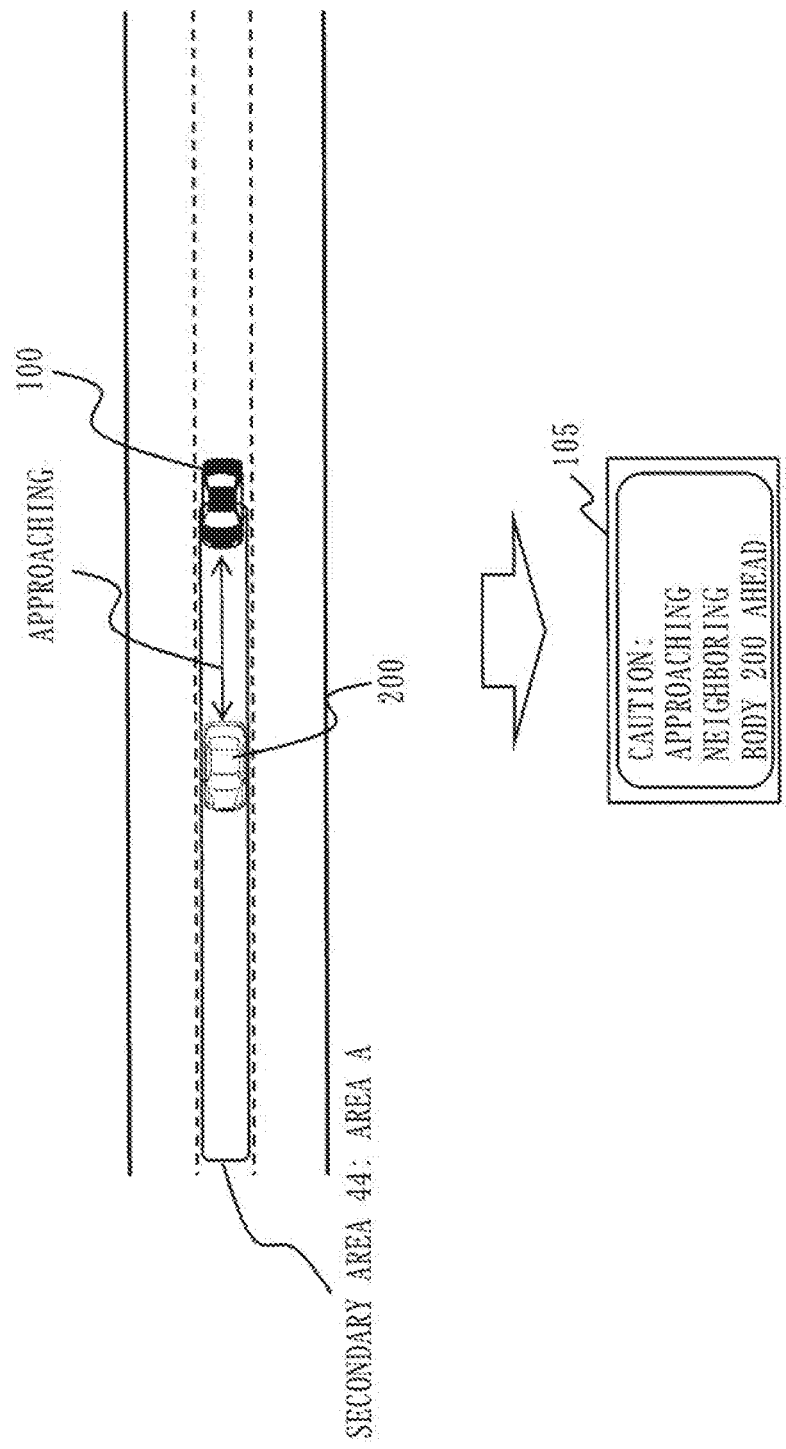
FIG. 32 is an illustrative diagram of the overview of the operation of the position estimation apparatus 10 according to the sixth embodiment.

Specifically, the assistance unit 23 determines that driving assistance is necessary when the secondary area 44 is determined to be the area A, which is in the same lane as the lane where a target body 100 travels, and the target body 100 and a neighboring body 200 are approaching each other as illustrated in FIG. 32. The display 105 then displays the assistance information 47 indicating that the neighboring body 200 ahead is approaching to possibly collide with the object.

Note that in the sixth embodiment, the assistance information 47 is displayed on the display 105 under the assumption that the assistance information 47 is a character, an icon, or an image. The assistance information 47 may however be information such as voice or a signal value, in which case a driver may be notified of the assistance information 47 by a method such as outputting the information from a speaker, turning on a lamp, generating vibration on a steering wheel or a seat, or tightening a seat belt.

The details of the operation of the position estimation apparatus 10 according to the sixth embodiment will be described with reference to FIGS. 31 and 33.

In position estimation processing of step S501, the position estimation apparatus 10 determines the secondary area 44 by the processings from step S401 to step S410 illustrated in FIG. 23.

In assistance determination processing of step S502, the assistance unit 23 determines whether or not driving assistance is necessary on the basis of the target information 31 and the neighboring information 32 and 34 acquired in step S501 as well as the secondary area 44 determined in step S501.

Specifically, the assistance unit 23 calculates a risk of collision between the target body 100 and the neighboring body 200 on the basis of the target information 31, the neighboring information 32 and 34, and the secondary area 44, and determines that driving assistance is necessary when the risk of collision is high.

In the sixth embodiment, the assistance unit 23 determines that the risk of collision is high when the distance between the target body 100 and the neighboring body 200 indicated by the target information 31 and the neighboring information 32 and 34 is less than a distance threshold and at the same time the secondary area 44 is the area A or the area B. In other words, the assistance unit 23 determines that the risk of collision is high when the target body 100 and the neighboring body 200 are close to each other and traveling in the same lane. Note that the assistance unit 23 may calculate time to collision as the risk of collision. The assistance unit 23 may also use another information such as the speed or acceleration of the target body 100 and the neighboring body 200 to determine whether or not the risk of collision is high.

The assistance unit 23 advances the processing to step S503 if driving assistance is necessary, or ends the processing if no driving assistance is necessary.

In driving assistance processing of step S503, the assistance unit 23 transmits the assistance information 47 indicating that the risk of collision is high to the display 105 via the display interface 15. The assistance information 47 is thus displayed on the display 105.

The assistance information 47 may not only indicate that the risk of collision is high but also indicate the direction in which the neighboring body 200 is present and the time to collision. Moreover, in order to indicate that the risk of collision is high, the assistance unit 23 may simply display "caution" or "danger", or more specifically display "vehicle approaching", "watch out for bicycle running out", "watch out for pedestrian running out", or "watch out for intersection".

Effects of Sixth Embodiment

The position estimation apparatus 10 according to the sixth embodiment performs driving assistance by using the secondary area 44, as described above. The position estimation apparatus 10 can accurately estimate the secondary area 44. The system can thus perform appropriate driving assistance.

Specifically, the position estimation apparatus 10 is less likely to determine that the risk of collision is high despite the fact that the target body 100 and the neighboring body 200 are traveling on different lanes as illustrated in FIG. 7. Therefore, a driver is less likely to be notified of false assistance information 47.

Other Configurations

<Tenth Variation>

The sixth embodiment displays the assistance information 47 on the display 105 when the risk of collision is high. As a tenth variation, a controller 106 such as an accelerator, a brake, and/or a steering wheel may be controlled when the risk of collision is high. The tenth variation will be described focusing on a difference from the sixth embodiment.

Figure 34:
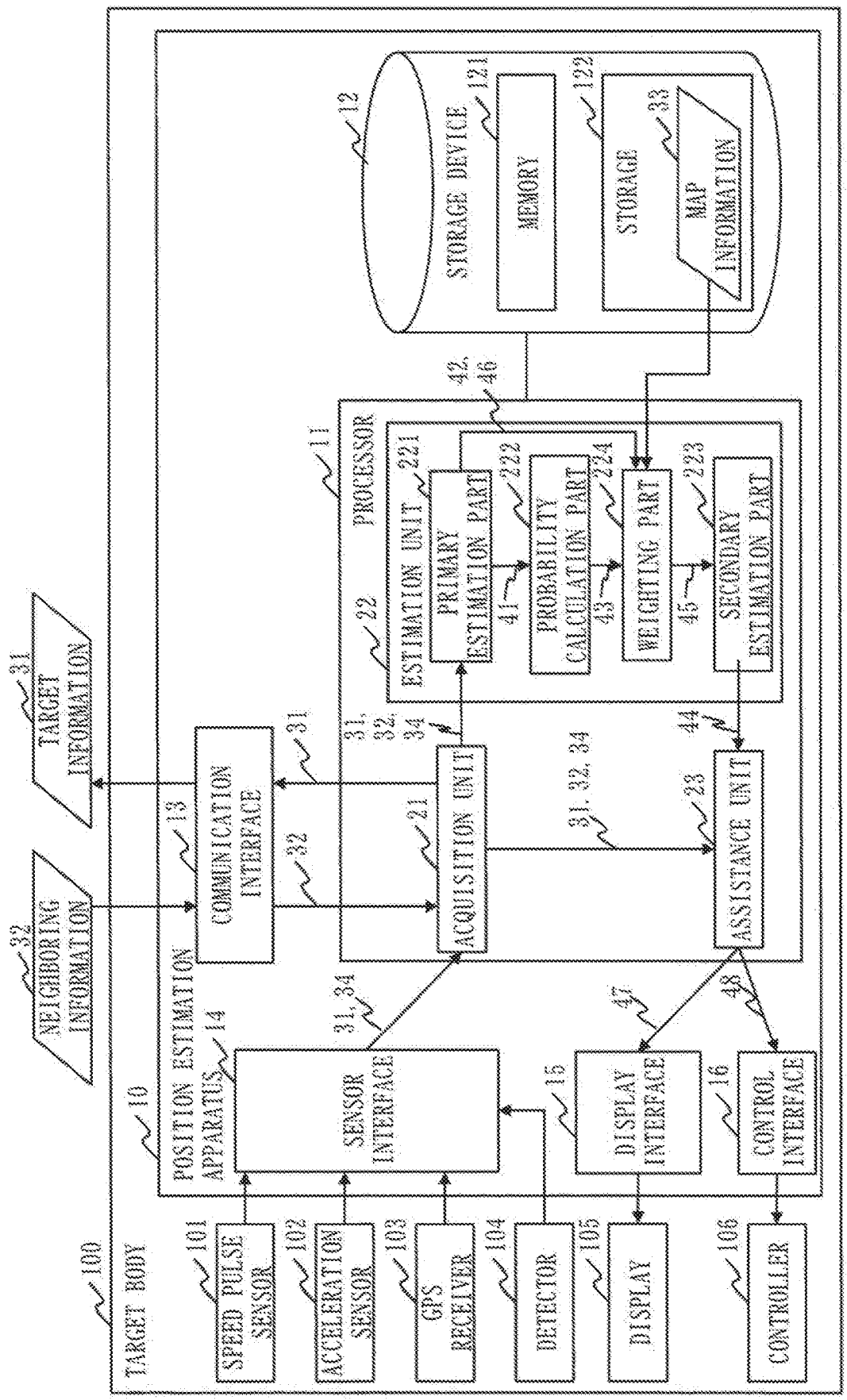
FIG. 34 is a block diagram of a position estimation apparatus 10 according to a tenth variation.

The configuration of the position estimation apparatus 10 according to the tenth variation will be described with reference to FIG. 34.

Figure 31:
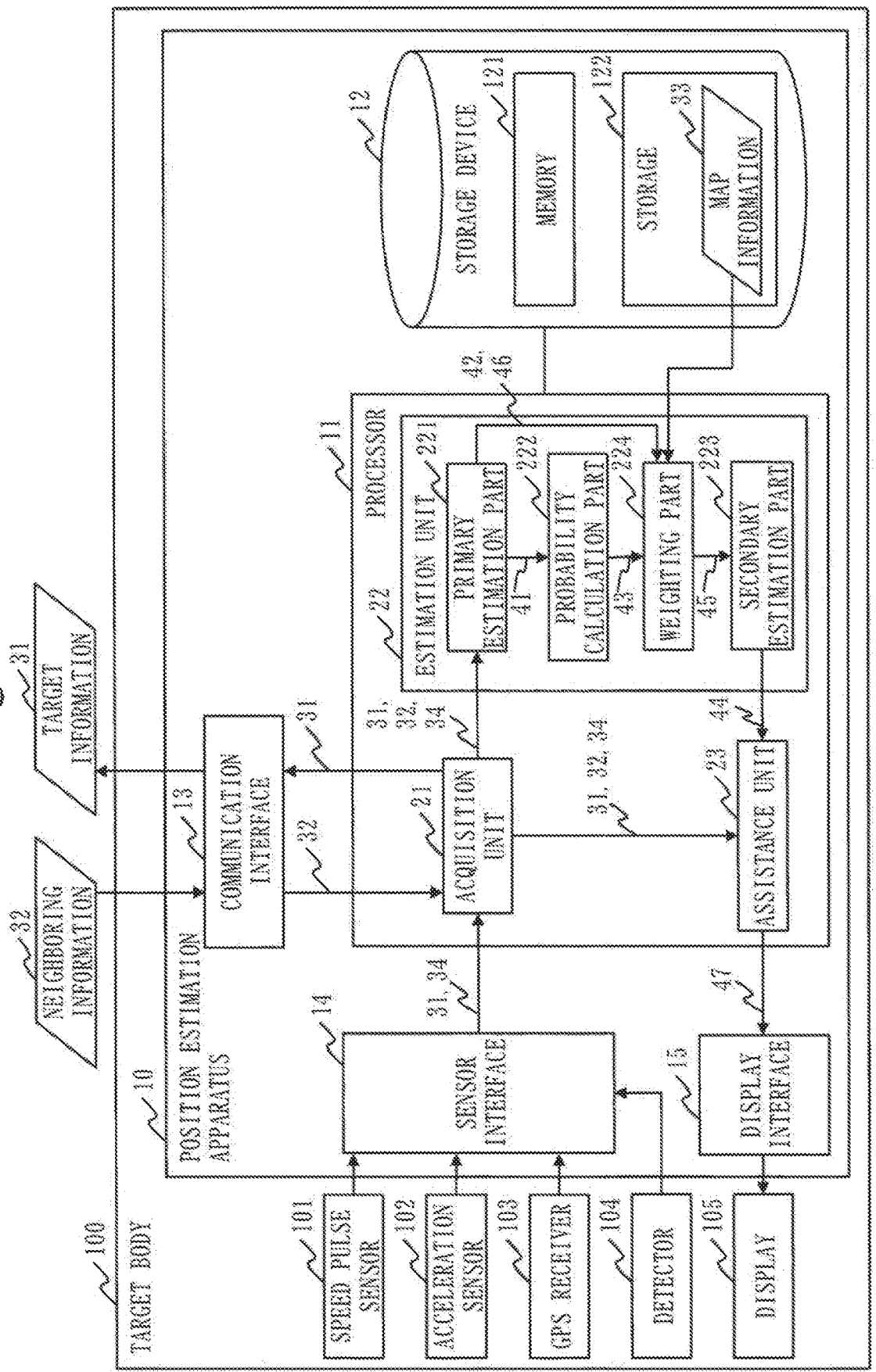
FIG. 31 is a block diagram of a position estimation apparatus 10 according to a sixth embodiment.

The position estimation apparatus 10 includes a control interface 16 in addition to the configuration illustrated in FIG. 31. The control interface 16 is a device for connecting the controller 106 such as the accelerator, the brake, and the steering wheel. The control interface 16 is specifically a vehicle control ECU.

Figure 35:
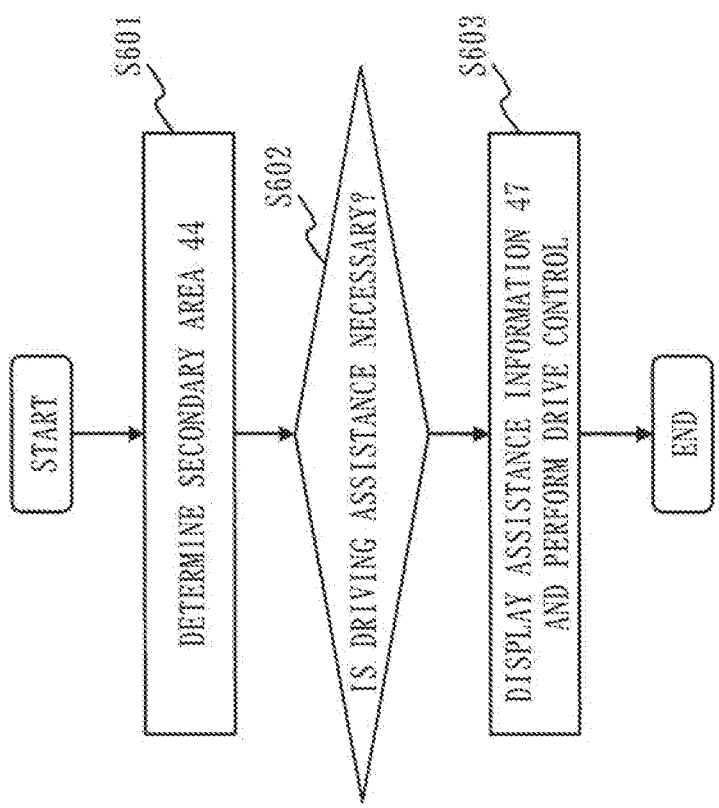
FIG. 35 is a flowchart illustrating the operation of the position estimation apparatus 10 according to the tenth variation.

The operation of the position estimation apparatus 10 according to the tenth variation will be described with reference to FIGS. 34 and 35.

Figure 33:
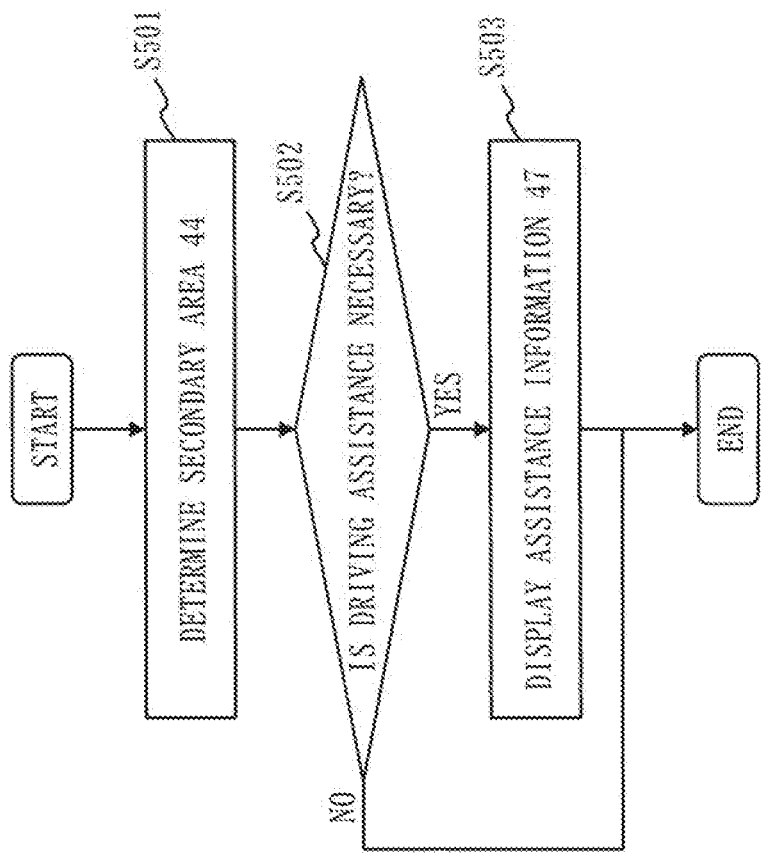
FIG. 33 is a flowchart illustrating the operation of the position estimation apparatus 10 according to the sixth embodiment.

Steps S601 to S602 are the same as steps S501 to S502 of FIG. 33.

In step S603, the assistance unit 23 displays the assistance information 47 on the display 105 and transmits control information 48 to the controller 106 via the control interface 16, thereby controlling the controller 106 and moving the target body 100 to avoid collision. Specifically, when the risk of collision of the target body 100 with the neighboring body 200 in the area A is high, the assistance unit 23 relaxes the accelerator and actuates the brake to decrease the speed of the target body 100. The assistance unit 23 may also control the steering wheel to avoid the neighboring body 200.

<Eleventh Variation>

In the second to sixth embodiments, the function of each part of the position estimation apparatus 10 is implemented in software as with the first embodiment. However, as with the third variation of the first embodiment, the function of each part of the position estimation apparatus 10 may be implemented in hardware. Alternatively, as with the fourth variation of the first embodiment, some functions of the position estimation apparatus 10 may be implemented in hardware while other functions may be implemented in software.

The embodiments of the present invention have been described above. Some of these embodiments and variations may be implemented in combination. Alternatively, any one or some of them may be partially implemented. Note that the present invention is not to be limited by the above embodiments and variations but can be modified in various manners as needed.

REFERENCE SIGNS LIST

10: position estimation apparatus, 11: processor, 12: storage device, 121: memory, 122: storage, 13: communication interface, 14: sensor interface, 15: display interface, 16: control interface, 21: acquisition unit, 22: estimation unit, 221: primary estimation part, 222: probability calculation part, 223: secondary estimation part, 224: weighting part, 23: assistance unit, 31: target information, 32: neighboring information, 33: map information, 34: neighboring information, 40: relative area, 41: primary area, 42: relative information, 43: probability of presence, 44: secondary area, 45: weighted probability, 46: relative vector, 47: assistance information, 48: control information, 100: target body, 101: speed pulse sensor, 102: acceleration sensor, 103: GPS receiver, 104: detector, 105: display, 106: controller, 111: processing circuit, 200: neighboring body.

The invention claimed is:

1. A position estimation apparatus comprising:
   an acquisition unit to acquire target information regarding a position of a target body which is a movable body and neighboring information regarding a position of a neighboring body, which is a movable body different from the target body, from the neighboring body;
   a primary estimation part to estimate a relative position between the target body and the neighboring body from the target information and the neighboring information, and determine, as primary areas, relative areas corresponding to each relative position, respectively, among a plurality of relative areas obtained by dividing an area around the target body;
   a probability calculation part to calculate a probability of presence of the neighboring body in each of the relative areas determined as the primary areas within a reference period by the primary estimation part;
   a weighting part to weight the probability of presence for at least some of the relative areas determined as the primary areas, from a change in the relative position; and
   a secondary estimation part to determine, as a secondary area, a relative area in which the neighboring body is estimated to be present, on the basis of the probability of presence weighted by the weighting part,
   wherein the weighting part performs at least one from among:
   (a) increases the probability of presence in a relative area corresponding to a lane adjacent to a lane in which the target body moves among the plurality of relative areas, based on a front relationship and a rear relationship between the target body and the neighboring body being reversed,
   (b) increases the probability of presence in a relative area corresponding to a same lane as the lane in which the target body moves among the plurality of relative areas, based on a relative speed between the target body and the neighboring body being decreased as a distance between the target body and the neighboring body decreases,
   (c) based on the neighboring body crossing from one side to other side with respect to the target body, decreases the probability of presence in a relative area corresponding to the one side among the plurality of relative areas, wherein the one side is a left side or a right side, and the other side is the right side or the left side, respectively, with respect to the target body,
   (d) increases the probability of presence for a relative area located in a direction indicated by a relative vector among the plurality of relative areas, the relative vector being obtained by subtracting a velocity vector of the neighboring body from a velocity vector of the target body, and
   (e) weights the probability of presence such that the probability of presence for the relative area determined to be one of the primary areas is higher as a degree of correlation between the neighboring information acquired from the neighboring body and the neighboring information acquired by a detector of the acquisition unit is higher.

2. The position estimation apparatus according to claim 1, wherein the weighting part increases the probability of presence in a relative area corresponding to the same lane as the lane in which the target body moves among the plurality of relative areas, based on the change in the relative position being smaller than or equal to a reference value.

3. The position estimation apparatus according to claim 1, wherein the weighting part decreases the probability of presence for a relative area with regard to which non-presence of the neighboring body therein is indicated by map information among the plurality of relative areas.

4. The position estimation apparatus according to claim 1, wherein the acquisition unit further acquires the neighboring information repeatedly via the detector.

5. The position estimation apparatus according to claim 1, wherein the primary estimation part defines the plurality of relative areas on the basis of a road shape indicated by map information.

6. The position estimation apparatus according to claim 1, further comprising:
   an assistance unit to provide a notification or control the target body on the basis of the secondary area determined by the secondary estimation part.

7. A position estimation method of a position estimation apparatus, the position estimation method comprising:
   acquiring target information regarding a position of a target body, which is a movable body;

acquiring neighboring information regarding a position of a neighboring body, which is a movable body different from the target body, from the neighboring body;

estimating a relative position between the target body and the neighboring body from the target information and the neighboring information;

determining, as primary areas, relative areas corresponding to each relative position, respectively, among a plurality of relative areas obtained by dividing an area around the target body;

calculating a probability of presence of the neighboring body in each of the relative areas determined as the primary areas, within a reference period;

weighting the probability of presence for at least some of the relative areas determined as the primary areas, from a change in the relative position; and determining, as a secondary area, a relative area in which the neighboring body is estimated to be present based on the weighted probability of presence, wherein the weighting the probability of presence further comprises at least one from among:
(a) increasing the probability of presence in a relative area corresponding to a lane adjacent to a lane in which the target body moves among the plurality of relative areas, based on a front relationship and a rear relationship between the target body and the neighboring body being reversed,
(b) increasing the probability of presence in a relative area corresponding to a same lane as the lane in which the target body moves among the plurality of relative areas, based on a relative speed between the target body and the neighboring body being decreased as a distance between the target body and the neighboring body decreases,
(c) based on the neighboring body crossing from one side to other side with respect to the target body, decreasing the probability of presence in a relative area corresponding to the one side among the plurality of relative areas, wherein the one side is a left side or a right side, and the other side is the right side or the left side, respectively, with respect to the target body,
(d) increasing the probability of presence for a relative area located in a direction indicated by a relative vector among the plurality of relative areas, the relative vector being obtained by subtracting a velocity vector of the neighboring body from a velocity vector of the target body, and
(e) weighting the probability of presence such that the probability of presence for the relative area determined to be one of the primary areas is higher as a degree of correlation between the neighboring information acquired from the neighboring body and the neighboring information acquired by a detector of the position estimation apparatus is higher.

8. A non-transitory computer readable medium storing a position estimation program that, when executed by a computer of a position estimation apparatus, causes the computer to execute:

acquisition processing to acquire target information regarding a position of a target body, which is a movable body, and neighboring information regarding a position of a neighboring body, which is a movable body different from the target body, from the neighboring body;

primary estimation processing to estimate a relative position between the target body and the neighboring body from the target information and the neighboring information, and determine, as primary areas, relative areas corresponding to each relative position, respectively, among a plurality of relative areas obtained by dividing an area around the target body;

probability calculation processing to calculate a probability of presence of the neighboring body in each of the relative areas determined as the primary areas, within a reference period;

weighting processing to weight the probability of presence for at least some of the relative areas determined as the primary areas, from a change in the relative position; and secondary estimation processing to determine, as a secondary area, a relative area in which the neighboring body is estimated to be present, on the basis of the weighted probability of presence, wherein the weighting processing further performs at least one from among:
(a) increases the probability of presence in a relative area corresponding to a lane adjacent to a lane in which the target body moves among the plurality of relative areas, based on a front relationship and a rear relationship between the target body and the neighboring body being reversed,
(b) increases the probability of presence in a relative area corresponding to a same lane as the lane in which the target body moves among the plurality of relative areas, based on a relative speed between the target body and the neighboring body being decreased as a distance between the target body and the neighboring body decreases,
(c) based on the neighboring body crossing from one side to other side with respect to the target body, decreases the probability of presence in a relative area corresponding to the one side among the plurality of relative areas, wherein the one side is a left side or a right side, and the other side is the right side or the left side, respectively, with respect to the target body,
(d) increases the probability of presence for a relative area located in a direction indicated by a relative vector among the plurality of relative areas, the relative vector being obtained by subtracting a velocity vector of the neighboring body from a velocity vector of the target body, and
(e) weights the probability of presence such that the probability of presence for the relative area determined to be one of the primary areas is higher as a degree of correlation between the neighboring information acquired from the neighboring body and the neighboring information acquired by a detector of the position estimation apparatus is higher.

* * * * *